United States Patent
Al-Yami et al.

(10) Patent No.: US 9,202,169 B2
(45) Date of Patent: Dec. 1, 2015

(54) SYSTEMS AND METHODS FOR DRILLING FLUIDS EXPERT SYSTEMS USING BAYESIAN DECISION NETWORKS

(71) Applicants: Saudi Arabian Oil Company, Dhahran (SA); The Texas A&M University System, College Station, TX (US)

(72) Inventors: Abdullah Saleh Hussain Al-Yami, Dhahran (SA); Jerome Schubert, College Station, TX (US)

(73) Assignees: Saudi Arabian Oil Company, Dhahran (SA); The Texas A&M University System, College Station, TX (US)

( * ) Notice: Subject to any disclaimer, the term of this patent is extended or adjusted under 35 U.S.C. 154(b) by 296 days.

(21) Appl. No.: 13/827,408

(22) Filed: Mar. 14, 2013

(65) Prior Publication Data

US 2014/0129486 A1 May 8, 2014

Related U.S. Application Data

(60) Provisional application No. 61/722,039, filed on Nov. 2, 2012.

(51) Int. Cl.
  *G06N 5/02* (2006.01)
  *G06N 7/00* (2006.01)
  *G06F 17/00* (2006.01)
(52) U.S. Cl.
  CPC . *G06N 5/02* (2013.01); *G06N 7/005* (2013.01)
(58) Field of Classification Search
  None
  See application file for complete search history.

(56) References Cited

U.S. PATENT DOCUMENTS

| | | | |
|---|---|---|---|
| 4,460,045 | A | 7/1984 | Elson et al. |
| 5,749,419 | A | 5/1998 | Coronado et al. |
| 6,826,486 | B1 | 11/2004 | Malinverno |
| 7,028,586 | B2 | 4/2006 | Robichaux |
| 7,092,928 | B1 | 8/2006 | Elad et al. |
| 7,509,297 | B2 | 3/2009 | Kerisit |
| 7,650,321 | B2 | 1/2010 | Krishnan et al. |
| 2003/0116887 | A1 | 6/2003 | Scott |
| 2004/0113061 | A1 | 6/2004 | Valant-Spaight |

(Continued)

FOREIGN PATENT DOCUMENTS

| | | |
|---|---|---|
| EP | 2090742 A1 | 8/2009 |
| WO | 2006112864 A2 | 10/2006 |

OTHER PUBLICATIONS

Al-Yami et al, Expert System for the Optimal Design and Execution of Successful Completion Practices Using Artificial Bayesian Intelligence, 2011.*

(Continued)

*Primary Examiner* — David Vincent
*Assistant Examiner* — Mikayla Chubb
(74) *Attorney, Agent, or Firm* — Bracewell & Giuliani LLP; Constance Gall Rhebergen; Brian H. Tompkins

(57) ABSTRACT

Provided are systems and methods for drilling fluids expert systems using Bayesian decision networks to determine drilling fluid recommendations. A drilling fluids expert system includes a drilling fluids Bayesian decision network (BDN) model that receives inputs and outputs recommendations based on Bayesian probability determinations. The drilling fluids BDN model includes a temperature ranges uncertainty node, a formation uncertainty node, a potential hole problems uncertainty node, and a drilling fluids decision node.

20 Claims, 34 Drawing Sheets

(56) References Cited

U.S. PATENT DOCUMENTS

| | | | |
|---|---|---|---|
| 2004/0154801 A1* | 8/2004 | Pandey | 166/308.1 |
| 2005/0091012 A1 | 4/2005 | Przytula et al. | |
| 2005/0192855 A1 | 9/2005 | Chitty et al. | |
| 2005/0241679 A1 | 11/2005 | Rauch et al. | |
| 2009/0076873 A1 | 3/2009 | Johnson et al. | |
| 2009/0132458 A1* | 5/2009 | Edwards et al. | 706/50 |
| 2009/0182572 A1 | 7/2009 | Mendoza Garrido | |
| 2009/0327207 A1 | 12/2009 | Anderson et al. | |
| 2010/0084191 A1* | 4/2010 | Chapman et al. | 175/24 |
| 2010/0112217 A1 | 5/2010 | Pawlik et al. | |
| 2011/0155462 A1* | 6/2011 | Du Castel et al. | 175/24 |
| 2011/0225111 A1* | 9/2011 | Ringer | 706/14 |
| 2012/0069131 A1 | 3/2012 | Abelow | |

OTHER PUBLICATIONS

Al-Yami et al, Guidelines for Optimum Underbalanced Drilling Practices Using Artificial Bayesian Intelligence, 2012.*
Written Opinion of International Preliminary Examining Authority in PCT/US2013/067639 mailed Nov. 25, 2014.
Written Opinion of International Preliminary Examining Authority in PCT/US2013/067644 mailed Nov. 25, 2014.
Al-Yami et al. "The Use of Artificial Bayesian Intelligence in Practical Well Control" SPE Russian Oil & Gas Exploration & Production Technical Conference and Exhibition, Moscow, Russia, Oct. 16-18, 2012, SPE 160662, pp. 1-24, XP055127770.
International Search Report and Written Opinion, PCT/US2013/067387, mailed Sep. 23, 2014.
International Search Report and Written Opinion, PCT/US2013/067653, mailed Oct. 1, 2014.
Office Action for co-pending U.S. Appl. No. 13/827,581 dated Oct. 24, 2014.
'Building Bayesian Networks From Basin Modeling Scenarios for Improved Geological Decision Making', Gabriele Martinelli et al., Petroleum Geoscience Jul. 30, 2012, pp. 1-27.
'Development of a Drilling Expert System for Designing and Applying Successful Cement Jobs', A.S. Al-Yami et al., IADC/SPE 135183, Asia Pacific Drilling Technology Conference and Exhibition Nov. 2010, pp. 1-23.
'Using Bayesian Network to Develop Drilling Expert Systems', http://repository.tamu.edu/handle/1969.1/ETD-TAMU-2012-08-11454, pp. 1-3.
'SeTES, A Self-Teaching Expert System for the Analysis, Design, and Prediction of Gas Production From Unconventional Gas Resources', Research Partners to Secure Energy for America, George J. Moridis et al., Nov. 28, 2011, pp. 1-116.
Al-Yami et al. "Expert System for the Optimal Design and Execution of Successful Completion Practices Using Artificial Bayesian Intelligence" SPE 143826, Brasil Offshore Conference and Exhibition, Macaé, Brazil, Jun. 14-17, 2011, pp. 1-24, XP055127773.
Al-Yami et al. "Guidelines for Optimum Underbalanced Drilling Practices Using Artificial Bayesian Intelligence" OTC 22883, Offshore Technology Conference, Houston, Texas, Apr. 30, 2012-May 3, 2012, pp. 1-57, XP055128243.
Al-Yami et al. "Underbalanced Drilling Expert System Development" SPE 152101, SPE Western Regional Meeting, Bakersfield, California, Mar. 19-23, 2012, pp. 1-41, XP055128240.
International Search Report and Written Opinion, PCT/US2013/067639, dated Jul. 21, 2014.
International Search Report and Written Opinion, PCT/US2013/067644, dated Jul. 17, 2014.
International Preliminary Report on Patentability for PCT/US2013/067387 dated Apr. 21, 2015.
International Preliminary Report on Patentability for PCT/US2013/067653 dated Apr. 21, 2015.
International Preliminary Report on Patentability for PCT/US2013/067639 dated Feb. 25, 2015.
International Preliminary Report on Patentability for PCT/US2013/067644 dated Feb. 25, 2015.
Basseville "Detecting Changes in Signals and Systems—A Survey" Automatica, vol. 24, No. 3, 1988, pp. 309-326.
Garrouch et al. "Development of an expert system for underbalanced drilling using fuzzy logic" Journal of Petroleum Science & Engineering, vol. 31, 2001, pp. 23-39.
Lloyd et al. "Practical Application of Real-Time Expert System for Automatic Well Control" IADC/SPE 19919, IADC/SPE Drilling Conference, Houston, Texas, Feb. 27-Mar. 2, 1990, 12 pages.
MacArthur "Coiled tubing provides advantages for UB operations" Drilling Contractor, Jul./Aug. 2003, pp. 40-41.
Martin "Managed Pressure Drilling Techniques and Tools" Thesis for Master of Science degree, Petroleum Engineering, Texas A&M University, May 2006, 65 pages.
Muir "Managed Pressure Drilling (MPD) Systems & Applications" retrieved at http://www.drillsafe.org.au/06-08_pres/DrillSafe_Forum_Jun08_KEEP_DRILLING_Ken_Muir_Managed_Pressure_Drilling_Talk.pdf, 2011, 36 pages.
Office Action for co-pending U.S. Appl. No. 13/827,746 dated Feb. 13, 2015.
Office Action for co-pending U.S. Appl. No. 13/827,794 dated Feb. 25, 2015.
Thomson et al. "Plan Recommendation for Well Engineering" Springer-Verlag Berlin Heidelberg, IEA/AIE, Part II, LNAI 6704, 2011, pp. 436-445.

* cited by examiner

| Swelling packer | Water Swelling Packer | | | | Oil Swelling Packer | | | |
|---|---|---|---|---|---|---|---|---|
| Drilling fluid | Formate drilling fluid | | CaCO₃ drilling fluid | | Formate drilling fluid | | CaCO₃ drilling fluid | |
| Treating fluid | Lactic acid | HCl acid | Lactic acid | HCl acid | Lactic acid | HCl acid | Lactic acid | HCl acid |
| Recommended | 0 | 0 | 1 | 0 | 1 | 0 | 0 | 1 |
| Not recommended | 1 | 1 | 0 | 1 | 0 | 1 | 1 | 0 |

FIG. 8

| Consequences | Recommended | Not Recommended |
|---|---|---|
| Value | 1 | 0 |

FIG. 9

| Swelling packer | Water Swelling Packer | Oil Swelling Packer |
|---|---|---|
| Formate drilling fluid | 0.74 | 0.5 |
| CaCO₃ drilling fluid | 0.26 | 0.5 |

FIG. 10

| Swelling packer | Water Swelling | | Oil Swelling | |
|---|---|---|---|---|
| Treating Fluid | | | | |
| Lactic acid | 0.9729 | | 0.2 | 0.8 |
| HCl acid | 0.027 | | 0.8 | 0.2 |
| Drilling fluid | | | | |
| Formate drilling fluid | Selected by user | | Selected by user | |
| CaCO₃ drilling fluid | | Selected by user | | Selected by user |

FIG. 11

| Swelling packer | Water Swelling Packer | Oil Swelling Packer |
|---|---|---|
| Recommended | 0.6923 | 0.8 |
| Not Recommended | 0.3076 | 0.2 |

FIG. 12

| Swelling packer | Water Swelling | Oil Swelling |
|---|---|---|
| Expected utility | 0.6923 | 0.8 |

FIG. 13

| Swelling packer | Water Swelling Packers | Oil Swelling Packers |
|---|---|---|
| Recommended | 0 | 1 |
| Not Recommended | 1 | 0 |

FIG. 14

| Recommended Drilling fluid | Formulation_1 | Formulation_2 | Formulation_3 | Formulation_4 | Formulation_5 |
|---|---|---|---|---|---|
| Expected utility | 0 | 0.45 | 0 | 0.15 | 0.15 |

| Recommended Drilling fluid | Formulation_6 | Formulation_7 | Formulation_8 | Formulation_9 | Formulation_10 |
|---|---|---|---|---|---|
| Expected utility | 0 | 0 | 0.85 | 0 | 0 |

FIG. 21

| Recommended Drilling fluid | Formulation_1 | Formulation_2 | Formulation_3 | Formulation_4 | Formulation_5 |
|---|---|---|---|---|---|
| Expected utility | 1 | 0 | 1 | 0 | 1 |

| Recommended Drilling fluid | Formulation_6 | Formulation_7 | Formulation_8 | Formulation_9 | Formulation_10 |
|---|---|---|---|---|---|
| Expected utility | 1 | 1 | 0 | 0 | 0 |

FIG. 23

| Recommended Drilling fluid | Formulation_1 | Formulation_2 | Formulation_3 | Formulation_4 | Formulation_5 |
|---|---|---|---|---|---|
| Expected utility | 0 | 0 | 1 | 0 | 0 |

| Recommended Drilling fluid | Formulation_6 | Formulation_7 | Formulation_8 | Formulation_9 | Formulation_10 |
|---|---|---|---|---|---|
| Expected utility | 0 | 0 | 0 | 0 | 0 |

FIG. 25

SYSTEMS AND METHODS FOR DRILLING FLUIDS EXPERT SYSTEMS USING BAYESIAN DECISION NETWORKS

PRIORITY CLAIM

This application claims priority to U.S. Provisional Patent Application No. 61/722,039 filed on Nov. 2, 2012, entitled "Systems and Methods for Drilling Fluids Expert Systems Using Bayesian Decision Networks," the disclosure of which is hereby incorporated by reference in its entirety.

BACKGROUND OF THE INVENTION

1. Field of the Invention

This invention relates generally to the drilling and extraction of oil, natural gas, and other resources, and more particularly to evaluation and selection of drilling fluids.

2. Description of the Related Art

Oil, gas, and other natural resources are used for numerous energy and material purposes. The search for extraction of oil, natural gas, and other subterranean resources from the earth may cost significant amounts of time and money. Once a resource is located, drilling systems may be used to access the resources, such as by drilling into various geological formations to access deposits of such resources. The drilling systems rely on numerous components and operational techniques to reduce cost and time and maximize effectiveness. For example, drill strings, drill bits, drilling fluids, and other components may be selected to achieve maximum effectiveness for a formation and other parameters that affect the drilling system. Typically, many years of field experience and laboratory work are used to develop and select the appropriate components for a drilling system. However, these techniques may be time-consuming and expensive. Moreover, such techniques may produce inconsistent results and may not incorporate recent changes in practices and opinions regarding the drilling systems.

SUMMARY OF THE INVENTION

Various embodiments of systems and methods for drilling fluids expert systems using Bayesian decision networks are provided herein. In some embodiments, a system is provided that includes one or more processors and a non-transitory tangible computer-readable memory. The memory includes drilling fluids expert system executable by the one or more processors and configured to provide one or more drilling fluids recommendations based on one or more inputs. The drilling fluids expert system includes a drilling fluids Bayesian decision network (BDN) model. The drilling fluids BDN model includes temperature ranges uncertainty node configured to receive one or more temperature ranges from the one or more inputs, a formations uncertainty node configured to receive one or more formations from the one or more inputs, a potential hole problems uncertainty node dependent on the formations uncertainty node and configured to receive one or more potential hole problems from the one or more inputs, and a drilling fluids decision node configured to receive one or more drilling fluids from the one or more inputs. The drilling fluids BDN model also includes a consequences node dependent on the temperature ranges uncertainty node, the potential hole problems uncertainty node, and the drilling fluids decision node and configured to output the one or more drilling fluids recommendations based on one or more Bayesian probabilities calculated from the one or more temperature ranges, the one or more potential hole problems, and the one or more drilling fluids.

A computer-implemented method for a drilling fluids expert system having a drilling fluids Bayesian decision network (BDN) model is also provided. The method includes receiving, at one or more processors, one or more inputs and providing, by one or more processors, the one or more inputs to one or more nodes of the drilling fluids BDN model. The one or more nodes include a temperature ranges uncertainty node, a formations uncertainty node, a potential hole problems uncertainty node dependent on the formations uncertainty node, a drilling fluids decision node, and a consequences node dependent on the temperature ranges uncertainty node, the potential hole problems uncertainty node, and the drilling fluids decision node. The method also includes determining, at one or more processors, one or more drilling fluids recommendations at the consequences node of the drilling fluids BDN model by calculating of one or more Bayesian probabilities based on the one or more inputs and providing, by one or more processors, the one or more drilling fluids recommendations to a user.

Additionally, a computer-implemented method for determining a drilling fluid formulation for a drilling system is provided. The method includes receiving, at one or more processors, an input from a user, the input comprising a temperature range, a formation, a potential hole problem, or any combination thereof, and providing, by one or more processors, the input to a drilling fluids Bayesian decision network (BDN) model configured to receive one or more drilling fluid formulations. The method also includes determining, by one or more processors, an expected utility value for the one or more drilling fluid formulations based on the input by calculating of one or more Bayesian probabilities for the one or more drilling fluid formulations based on the input and providing, by one or more processors, an output from the drilling fluids BDN model. The output includes one or more recommended drilling fluid formulations selected from the one or more drilling fluid formulations.

BRIEF DESCRIPTION OF THE DRAWINGS

FIGS. 5-8 are tables of the probability states associated with the nodes of the Bayesian decision network model of FIG. 4;

FIG. 9 is a table of input utility values assigned to a consequences node of the Bayesian decision network model of FIG. 4;

FIG. 10 is a table of total probability calculations for drilling fluid types of the Bayesian decision network model of FIG. 4;

FIG. 11 is a table of Bayesian probability determinations for the Bayesian decision network model of FIG. 4;

FIG. 12 is a table of consequences based on the Bayesian probability determinations depicted in FIG. 11;

FIG. 13 is a table of expected utilities based on the consequences depicted in FIG. 12;

FIG. 14 is a table of table of consequences based on the probability states depicted in FIG. 8;

FIG. 21 is a table of expected utilities output by the drilling fluids BDN model of FIG. 16A based on the selected inputs FIGS. 20A-20C in accordance with an embodiment of the present invention;

FIG. 23 is a table of expected utilities output by the drilling fluids BDN model of FIG. 16A based on the selected inputs FIGS. 22A and 22B in accordance with an embodiment of the present invention;

FIG. 25 is a table of expected utilities output by the drilling fluids BDN model of FIG. 16A based on the selected inputs FIGS. 24A and 24B of in accordance with an embodiment of the present invention;

Figure 1:
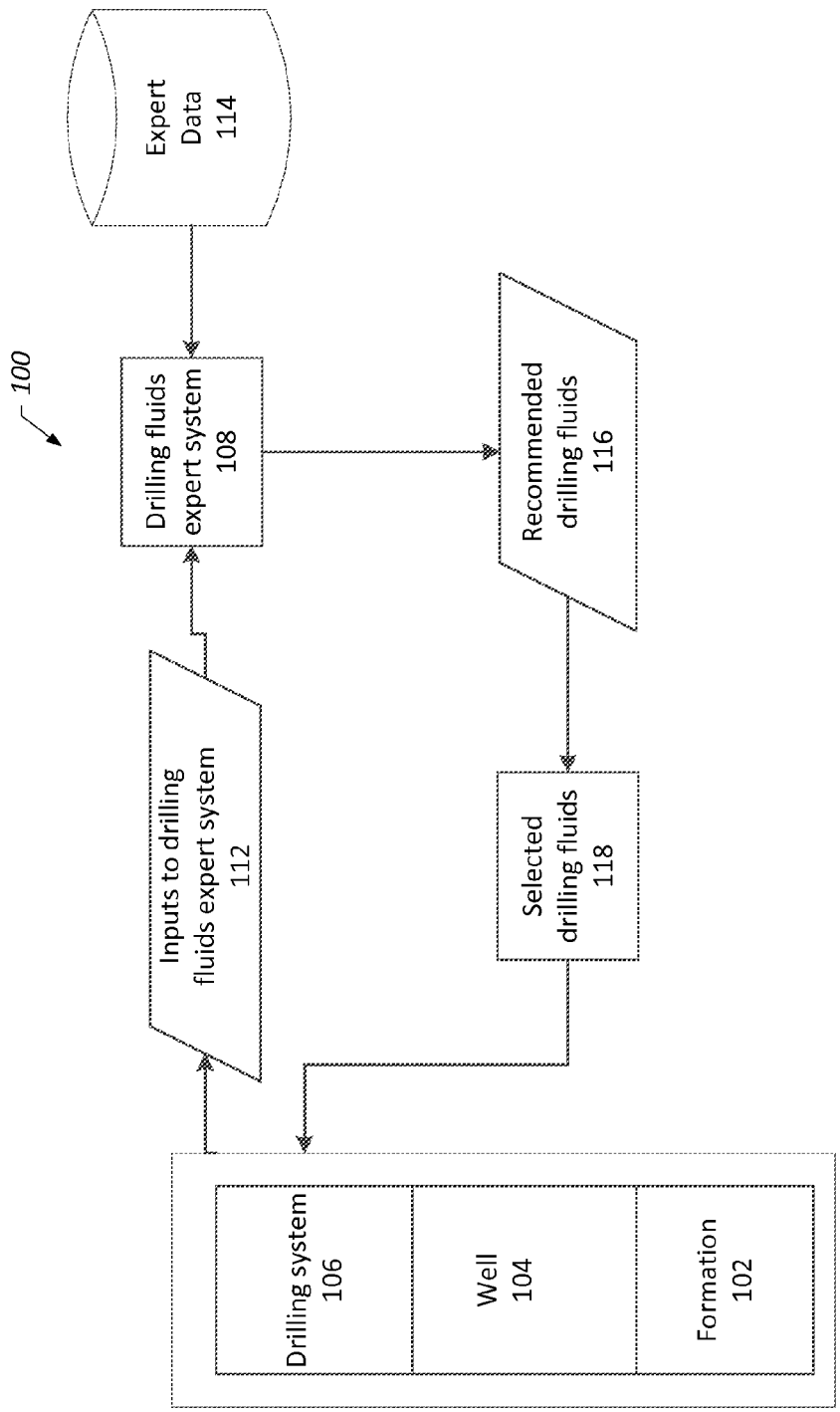
FIG. 1 is a block diagram that illustrates a system in accordance with an embodiment of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems, methods, and computer-readable media for a drilling fluids expert system based on a Bayesian decision network. In some embodiments, the drilling fluids expert system includes a user interface and probability data based on expert opinions. The drilling fluids expert system includes a temperature selection, a formation selection, and a potential hole problems selection arranged in a Bayesian decision network. The Bayesian decision network may evaluate the temperature, the formation, and the potential hole problem probabilities and provide recommendations for drilling fluids. A user may select a temperature, a formation, and a potential hole problem and receive one or more recommended drilling fluids from the drilling fluids expert system.

FIG. 1 is a block diagram that illustrates a system 100 in accordance with an embodiment of the present invention. The system 100 includes a formation 102, a well 104, and a drilling system 106. The system 100 also includes a drilling fluids expert system 108 for use with the drilling system 106. As described further below, the drilling fluids expert system 108 may be implemented on a computer and may include a Bayesian decision network to evaluate inputs and output recommended drilling fluids for use with the drilling system 106. As will be appreciated, the well 104 may be formed on the formation 102 to provide for extraction of various resources, such as hydrocarbons (e.g., oil and/or natural gas), from the formation 102. In some embodiments, the well 104 is land-based (e.g., a surface system) or subsea (e.g., a subsea system). The formation 102 may include The drilling system 106 may develop the well 104 by drilling a hole into the formation 102 using a drill bit, e.g., a roller cone bits, drag bits, etc. The drilling system 106 may generally include, for example, a wellhead, pipes, bodies, valves, seals and so on that enable drilling of the well 104, provide for regulating pressure in the well 16, and provide for the injection of chemicals into the well 104. During operation, the drilling system 106 may include a drilling fluid used to clean cuttings from the hole, cool the drill bit, and lubricate the drill bit. As described below, such drilling fluids may include a liquid (sometimes referred to as "drilling mud"), a gas, or other fluids and may be formed from a wide variety of formulations. In some embodiments, the well 104, drilling system 106 and other components may include sensors, such as temperature sensors, pressure sensors, and the like, to monitor the drilling process.

The drilling system 106, well 104, and formation 102 may provide a basis for various inputs 112 to the drilling expert system 108. For example, as described below, temperature ranges, the formation 102, and potential hole problems may be provided as inputs 112 to the drilling fluids expert system 08. The drilling expert system 108 may access an expert data repository 114 that includes expert data, such as probability data used by the drilling fluids expert system 108. The expert data may be derived from best practices, expert opinions, research papers, and the like. As described further below, based on the inputs 112, the drilling fluid expert system 108 may output recommended drilling fluids 116 for use in the drilling system 106. For example, the drilling fluids expert system 108 may provide the one or more optimal drilling fluid formulations for the combination of formation lithology, temperature, and potential hole problems associated with the drilling system 106. Based on these recommendations, a drilling fluid may be selected and the selected drilling fluid 118 may be used in the drilling system 106.

Figure 2:
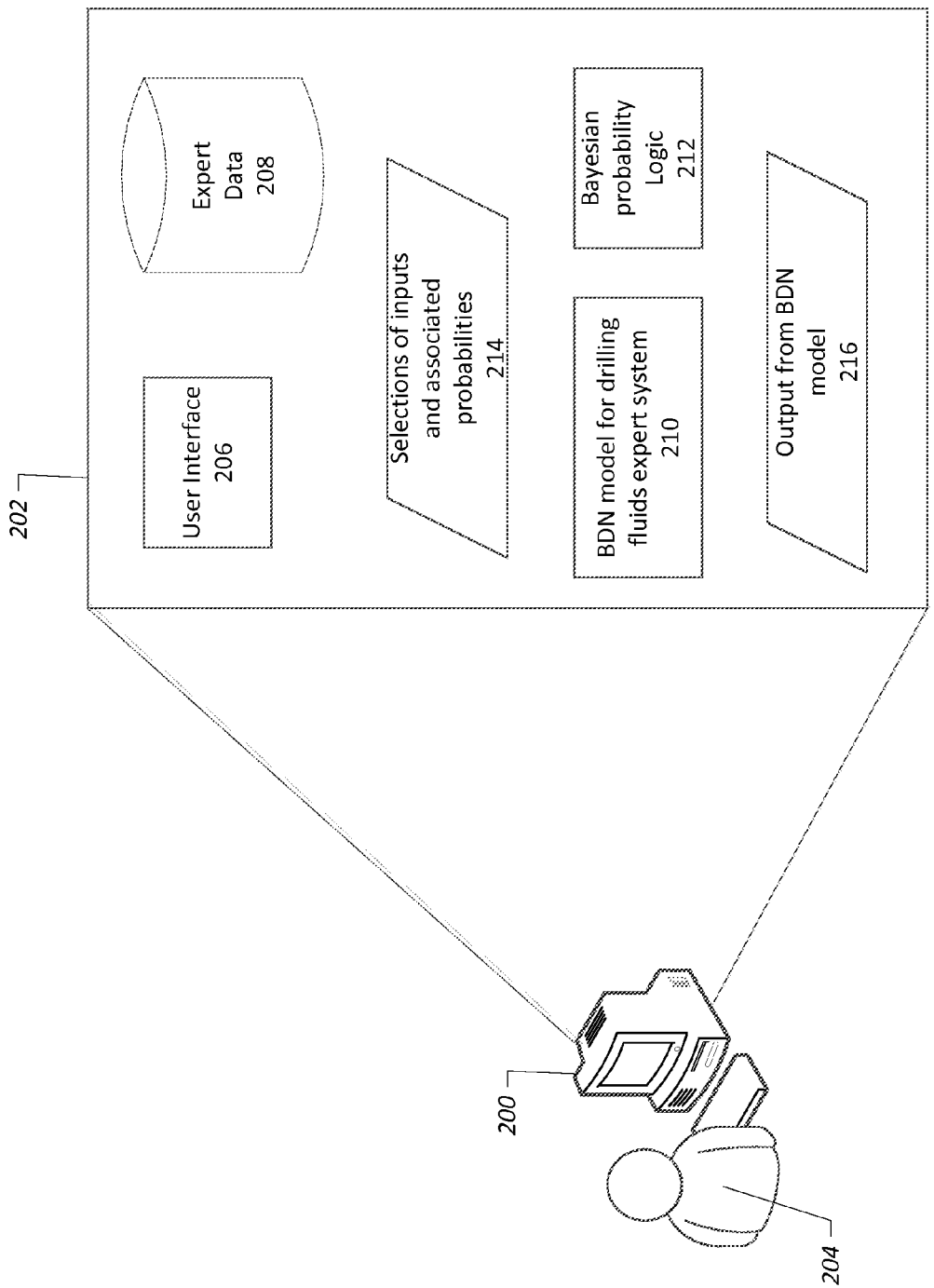
FIG. 2 is a schematic diagram of a computer and a drilling fluids expert system in accordance with an embodiment of the present invention.

FIG. 2 depicts a computer 200 implementing a drilling fluids expert system 202 in accordance with an embodiment of the present invention. As shown in FIG. 2, a user 204 may interact with the computer 200 and the drilling fluids expert system 202. In some embodiments, as shown in FIG. 2, the drilling fluids expert system 202 may be implemented in a single computer 200. However, in other embodiments, the drilling fluids expert system 202 may be implemented on multiple computers in communication with each other over a network. Such embodiments may include, for example, a client/server arrangement of computer, a peer-to-peer arrangement of computers, or any other suitable arrangement that enables execution of the drilling fluids expert system 202. In some embodiments, the drilling fluids expert system 202 may implemented as a computer program stored on a memory of the computer 200 and executed by a process of the computer 200.

In some embodiments, the drilling fluids expert system 202 may include a user interface 206 and an expert data repository 208. The user interface 206 may be implemented using any suitable elements, such as windows, menus, buttons, web pages, and so on. As described in detail below, the drilling fluids expert system 202 may include a Bayesian decision network (BDN) model 210 that implemented Bayesian probability logic 212. The BDN model 210 may evaluate selections of inputs and associated probabilities 214 and output a decision 216 from the BDN model. In the embodiments described herein, the inputs may include a formation, potential hole problems (that may be dependent on a specific formation), a temperature range, and drilling fluid formulations. The BDN model 210 may then calculate Bayesian probabilities for the consequences resulting from the selected inputs, and then output recommended drilling fluids. The output may include an expected utility value for each drilling fluid formulation to enable to user to evaluate and select the drilling fluid formulation having the optimal expected utility for the selected inputs.

As described below, a user 204 may use the user interface 206 to enter selections 210 of inputs for the BDN model 210. The associated probabilities for the inputs may be obtained from the expert data repository 208. Based on the inputs 210, a user 204 may receive the outputs 212 from the BDN model 210, such as recommended drilling fluid formulations and expected utility value. The output 212 may be provided for viewing in the user interface 206. Further, as explained below, a user may return to the drilling fluids expert system 202 to add or change the inputs 214. The BDN model 210 may recalculate the outputs 216 based on the added or changed inputs 214 and the Bayesian probability logic 212. The recalculated outputs 216 may then provide additional or changed recommended drilling fluid formulations and expected utility values. Here again, the outputs 216 may be provided to the user in the user interface 206.

Figure 3:
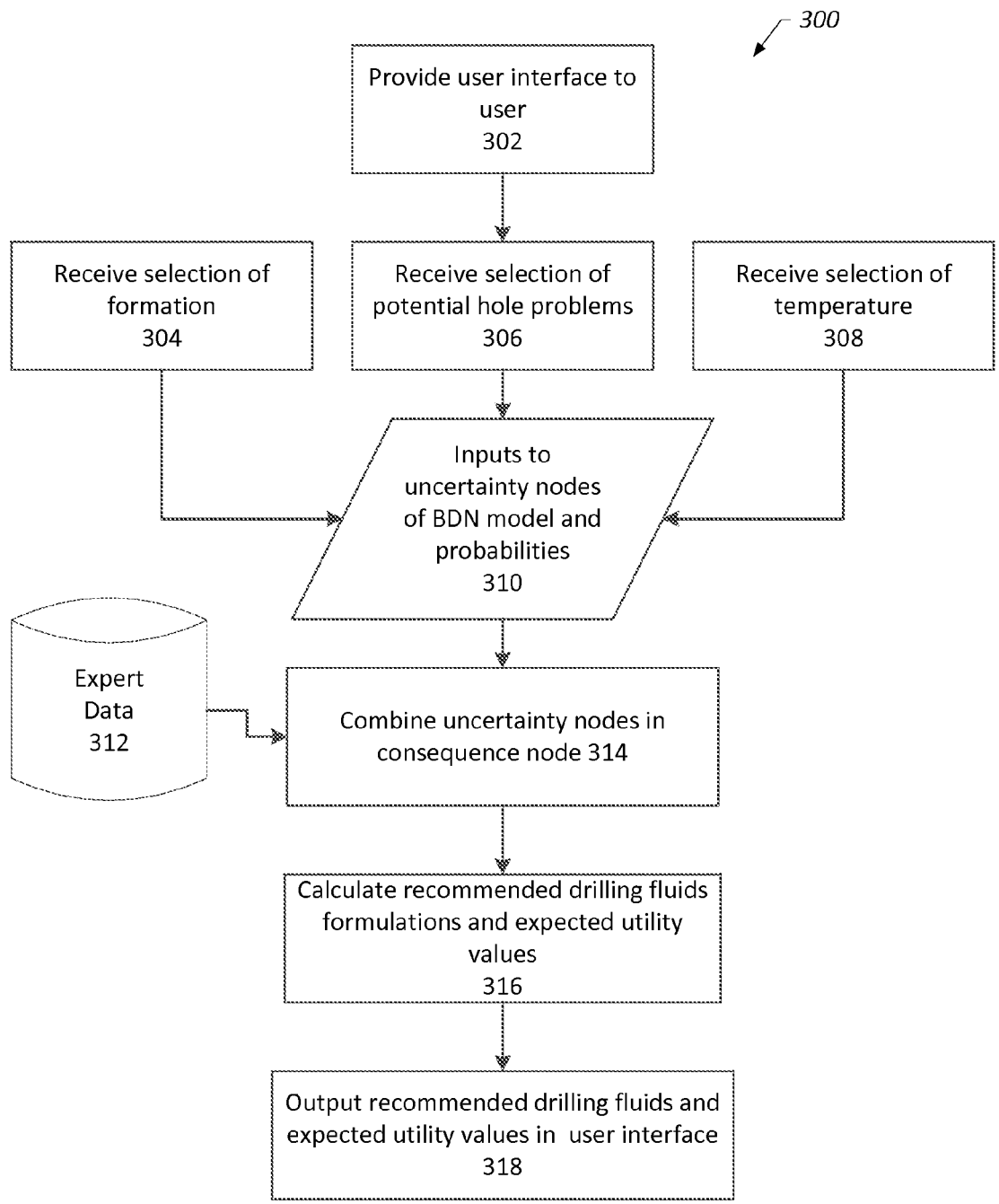
FIG. 3 is a block diagram of a process of a drilling fluids expert system in accordance with an embodiment of the present invention.

FIG. 3 depicts a process 300 of the operation of a drilling fluids expert system in accordance with an embodiment of the present invention. Initially, a user interface for a drilling fluids expert system may be provided to a user (block 302). From the user interface, various selections of inputs may be received. For example, a selection of a formation may be received (block 304), a selection of a potential hole problem may be received (block 306), and a selection of a temperature range (block 308). Any one of or combination of these selections may be received. As described below, the BDN model enables a user to enter inputs at any node of the BDN model. Moreover, as also illustrated below in FIG. 16A, the potential hole problems may be dependent on the selected formation.

Next, the received selections may be provided as inputs to uncertainty nodes of a drilling fluids BDN model of the drilling fluids expert system (block 310), and the selected inputs may include associated probability states, as received from expert data 312. Next, the data from the uncertainly nodes may be combined (i.e., propagated to) a consequence node based on the expert systems data (block 312). The propagation and determination of consequences is based on the Bayesian logic described below in FIGS. 16A-16G and implemented in the drilling fluids BDN model. Next, recommended drilling fluid formulations and expected utility values may be calculated by the BDN model (block 316). Finally, the recommended drilling fluid formulations and expected utility values may be output in a user interface of the drilling fluids expert system (block 318).

FIGS. 4-15 depict an example of a BDN model simulating the decision-making process of the selection of a swelling packer. The model described below in FIGS. 4-15 is illustrative of the application of a Bayesian decision network to the selection of a swelling packer for use in a drilling system. Based on the techniques illustrated in FIGS. 4-15 and described below, a drilling fluid BDN model, such as that described above in FIGS. 1-3, may be implemented. Such a drilling fluids BDN model is illustrated in detail in FIGS. 16A-16G. Thus, the techniques and implementation described in FIGS. 4-15 may be applied to the more detailed drilling fluids expert system illustrated in FIGS. 16A-16G.

Figure 4:
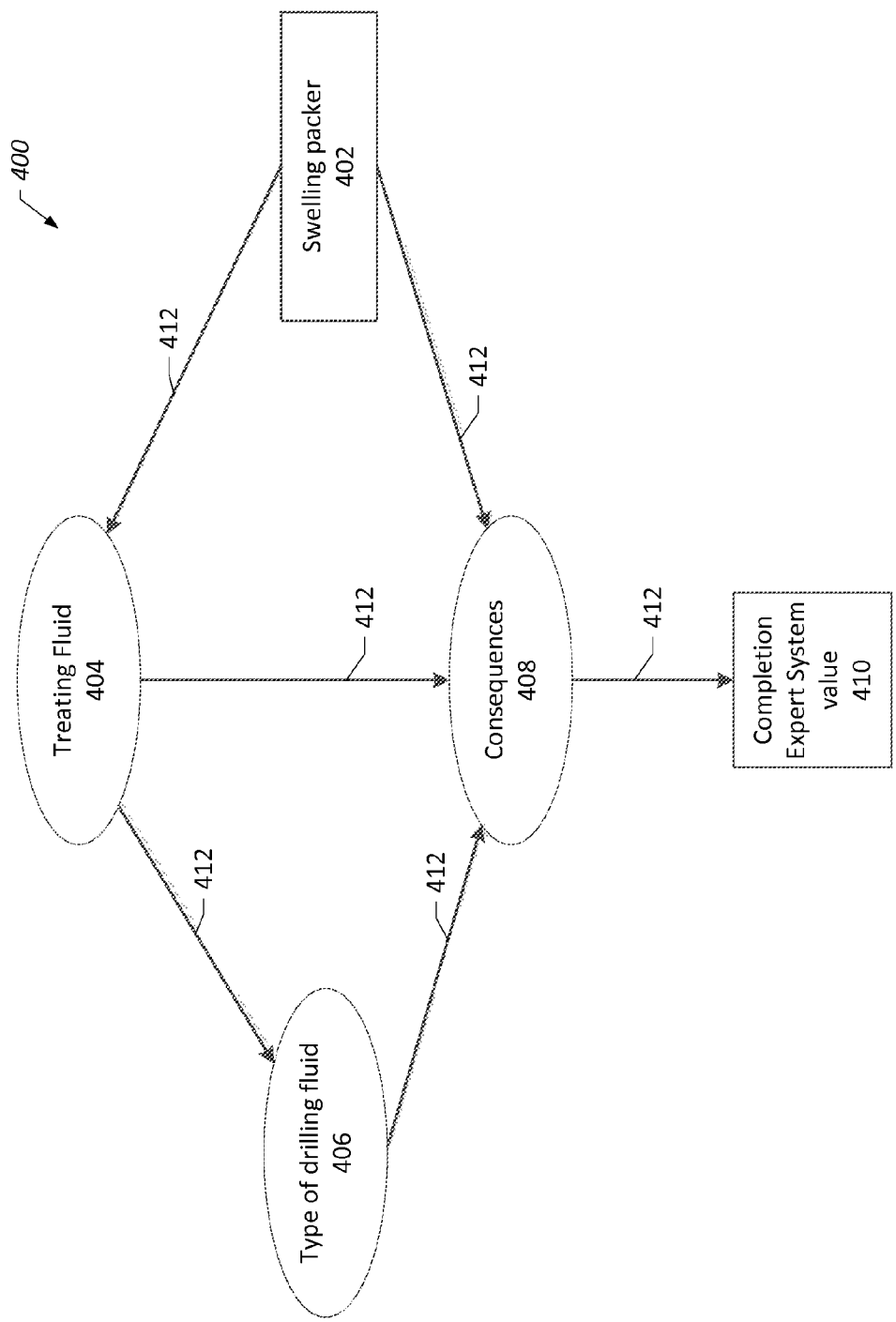
FIG. 4 is a schematic diagram of an example of a Bayesian decision network model for the selection of a swelling packer in accordance with an embodiment of the present invention.

FIG. 4 depicts a BDN model 400 for the selection of a swelling packer in accordance with an embodiment of the present invention. The BDN model 400 depicted in FIG. 4 includes a swelling packer decision node 402, a treating fluid uncertainty node 404, a drilling fluid type uncertainty node 406, a consequences node 408, and a completion expert system value node 410. As will be appreciated, the selection of a swelling packer may be relevant in the completion of a well to production status. In the illustrated BDN model 400, the various connection lines 412 indicate direct dependencies between the different nodes. Accordingly, the consequences node may be influenced by the inputs to the uncertainty nodes 404 and 406 and the decision node 402. Similarly, the treating fluid uncertainty node 404 may be influenced by the swelling packer decision node 402.

Figures 5, 6, 7:

After defining the BDN model 400, the probability states associated with each node may be defined. FIGS. 5-7 depict various tables illustrating the states, such as probability states, associated with each node of the BDN model 400. The probability distributions may be defined based on expert data entered in the BDN model 400. FIG. 5 depicts a table 500 illustrating the states associated with the swelling packer decision node 402. As shown in table 500, the swelling packer decision node 402 may have a first probability state 502 of "water swelling packer" and a second probability state 504 of "oil swelling packer." Next, FIG. 6 depicts a table 600 illustrating the probability states associated with the treating fluid uncertainty node 404. The probability states associated with the treating fluid uncertainty node 404 are influenced by the dependency on the swelling packer decision node 402. As shown in table 600, the probability states for two treating fluids 602 ("Lactic acid") and 604 ("HCl acid") are shown. For example, for a lactic acid treating fluid 602, the probability state for a water swelling packer 606 is 0.9 and the probability state for an oil swelling packer 608 is 0.5. Similarly, for an HCl acid treating fluid 604, the probability state for the water swelling packer 606 is 0.1 and the probability state for the oil swelling packer 608 is 0.5.

FIG. 7 depicts a table 700 illustrating the probability states associated with the drilling fluid type uncertainty node 406. As shown in the BDN model 400 depicted in FIG. 4, the drilling fluid type uncertainty node 406 is influenced by the dependency on the treating fluid uncertainty node 404 and the swelling packer decision node 406. In the table 700, the probably states associated with two drilling fluid types 702 ("Formate drilling fluid") and 704 ("$CaCO_3$ drilling fluid") are depicted for combinations of a water swelling packer 706, an oil swelling packer 708, a lactic acid treating fluid 710, and an HCl acid treating fluid 712. For example, as shown in FIG. 7, for the formate drilling fluid type 702, the probability state for the water swelling packer 706 and lactic acid treating fluid 710 is 0.8 and the probability state for the water swelling packer 706 and HCl acid treating fluid 712 is 0.2. Similarly, for the CaCO₃ drilling fluid type 704, the probability state for the water swelling packer 706 and lactic acid treating fluid 710 is 0.2 and the probability state for the water swelling packer 706 and HCl acid treating fluid 712 is 0.8. In a similar manner, the table 700 of FIG. 7 depicts the probability states for the oil swelling packer 708 and the various combinations of lactic acid treating fluid 710 and the HCl acid treating fluid 712, and the formate drilling fluid type 702 and the CaCO₃ drilling fluid type 704.

FIG. 8 depicts a table 800 illustrating the probability states of the consequences node 408. The consequences node 408 is influenced by its dependency on the swelling packer decision node 402, treating fluid uncertainty node 404, and the drilling fluid type uncertainty node 406. As shown in table 800, the probability states associated with two consequences 802 ("Recommended") and 804 ("Not recommended") are depicted for various combinations of a water swelling packer 806 or an oil swelling packer 808, a formate drilling fluid type 810 or a CaCO₃ drilling fluid type 812, and a lactic acid treating fluid 814 or an HCl acid treating fluid 816. For example, for the Recommended consequence 802, the probability state for the combination of water swelling packer 806, the formate drilling fluid 810, and lactic acid treating fluid 814 is 0 and the probability state for the combination of the water swelling packer 806, the formate drilling fluid 810, and HCl acid treating fluid 816 is 1. In another example, as shown in table 800, for the Not recommended consequence 804, the probability state for combination of the water swelling packer 806, the formate drilling fluid 810, and lactic acid treating fluid 814 is 1 and the probability state for the combination of the water swelling packer 806, the formate drilling fluid 810, and HCl acid treating fluid 816 is 0.

In the BDN model 400, the consequences associated with the consequences utility node 408 may be assigned input utility values. FIG. 9 depicts a table 900 illustrating the input utility values assigned to the consequences from the consequences utility node 408. As shown in table 900, a value 902 may be assigned to each consequence of the consequence node 408. For a consequence 904 of Recommended, an input utility value of 1 may be assigned. Similarly, for a consequence 906 of Not Recommended, an input utility value of 0 may be assigned. As described below, after the probability states for the consequences are determined in the BDN model 400, the input utility values assigned to each consequence may be combined.

Using the model and probabilities described above, the functionality of the BDN model 400 will be described. After receiving inputs to the model 400, the model 400 may simulate the uncertainty propagation based on the evidence, e.g., the probability states, at each node, using Bayesian probability determinations. A Bayesian probability may be determined according to Equation 1:

$$p(\text{hypothesis} | \text{evidence}) = \left( \frac{p(\text{evidence} | \text{hypothesis}) p(\text{hypothesis})}{p(\text{evidence})} \right) \quad (1)$$

Where:
p(hypothesis|evidence) is the probability of a hypothesis conditioned upon evidence;
p(evidence|hypothesis) is the probability the evidence is plausible based on the hypothesis;
p(hypothesis) is the degree of certainty of the hypothesis; and
p(evidence) is the degree of certainty of the evidence.

Referring again to the BDN model 400 discussed above, the model 400 illustrates that a selection of drilling fluid affects the treating fluid and the swelling packer, as illustrated by the dependencies in the model 400. First, the total probability for a drilling fluid type may be calculated based on the evidence from the uncertainty nodes by Equation 2:

$$\sum_{i=1}^{m} P(B | A_i) P(A_i) \quad (2)$$

Where:
$P(B|A)$ is the probability based on B in view of $A_i$;
$P(A_i)$ is the probability of $A_i$; and
m is the total number of evidence items.

Using Equation 2, the total probability for a drilling fluid type and lactic acid treating fluid may be calculated according to Equation 3:

$$\sum_{i=1}^{m} p(formateddrillingfluid | lacticacid_i) P(lacticacid_i) \quad (3)$$

For example, using the probability data illustrated in FIGS. 6 and 7, the total probability for a formate drilling fluid type may be calculated as the sum of 0.9 (probability for a lactic acid treating fluid and water swelling packer) multiplied by 0.8 (probability for a formate drilling fluid type, lactic acid treating fluid, and water swelling packer) and 0.1 (probability for a lactic acid treating fluid and water swelling packer) multiplied by 0.2 (probability for a lactic acid treating fluid and water swelling packer).

The results of the total probability calculations for drilling fluid types are illustrated in table 1000 depicted in FIG. 10. Table 1000 depicts the total probabilities for various combinations of drilling fluids 1002 ("Formate drilling fluid) and 1004 ("CaCO3 drilling fluid") and a water swelling packer 1006 and an oil swelling packer 1008. As explained above, the total probabilities at the drilling fluid uncertainty node are dependent on the evidence from the treating fluid uncertainty node and the swelling packer decision node. As shown in table 1000 of FIG. 10, the total probability for a formate drilling fluid 1002 and the water swelling packer 1006 is 0.74, and the total probability for a formate drilling fluid 1002 and the oil swelling packer 1008 is 0.5. Similarly, total probabilities for the CaCO₃ drilling fluid type 1004 are also depicted in table 1000.

Using the total probabilities determined above, the Bayesian probability determination of Equation 1 may be used to calculate the Bayesian probability of a treating fluid used with a specific drilling fluid type and a particular swelling packer. Accordingly, a Bayesian probability may be derived by combining the Bayesian probability of Equation 1 with the total probability calculation of Equation 2, resulting in Equation 4:

$$P(A_j | B) = \frac{p(B | A_j) P(A_j)}{\sum_{i=1}^{m} P(B | A_i)(P(A_i)} \quad (4)$$

Thus, based on Equation 4, the Bayesian probability determination for a lactic acid treating fluid and a formate drilling fluid type for a water swelling packer may be determined according to Equation 5, using the total probabilities depicted in the table 700 of FIG. 7 and the table 1000 of FIG. 10:

$$P\bigl(lacticacid \mid \text{formate}\bigr) = \left( \frac{P(\text{formate} \mid lacticacid)P(lacticacid)}{P(\text{formate})} \right) \quad (5)$$

$$= \frac{0.8 \times 0.9}{0.74}$$

$$= 0.9729$$

As depicted above in FIG. 7, the probability associated with a formate drilling fluid type conditioned on lactic acid treating fluid is 0.8 and the probability of lactic acid for a water swelling packer is 0.9. Additionally, as calculated above in FIG. 10, the total probability associated with a formate drilling fluid and a water swelling packer is 0.74. Using these probabilities, the Bayesian probability for a lactic acid treating fluid and a formate drilling fluid type may be calculated as shown in Equation 5. Similarly, Equation 6 depicts the Bayesian probability determination for an HCl treating fluid and a formate drilling fluid type, as shown below:

$$P\bigl(HClacid \mid \text{formate}\bigr) = \left( \frac{P(\text{formate} \mid HClacid)P(HClacid)}{P(\text{formate})} \right) \quad (6)$$

$$= \frac{0.2 \times 0.1}{0.74}$$

$$= 0.0270$$

As noted above, the values for the probabilities depicted in Equation 6 may be obtained from the probability states depicted in tables 600 and 700 of FIGS. 6 and 7 and the total probability calculations depicted in table 1000 of FIG. 10. In a similar manner, Equations 7 and 8 depict the Bayesian probability determinations for a CaCO$_3$ drilling fluid type:

$$P\bigl(lacticacid \mid CaCo_3\bigr) = \left( \frac{P(CaCo_3 \mid lacticacid)P(lacticacid)}{P(CaCo_3)} \right) \quad (7)$$

$$= \frac{0.2 \times 0.9}{0.26}$$

$$= 0.6923$$

$$P\bigl(HClacid \mid CaCo_3\bigr) = \left( \frac{P(CaCo_3 \mid HClacid)P(HClacid)}{P(CaCo_3)} \right) \quad (8)$$

$$= \frac{0.8 \times 0.1}{0.26}$$

$$= 0.3076$$

The Bayesian probability determinations may also be performed for an oil swelling packer for the various combinations of treating fluid and drilling fluid types. Using the probability states depicted in tables 600 and 700 of FIGS. 6 and 7 and the total probability calculations depicted in table 1000 of FIG. 10, these Bayesian probability determinations are shown below in Equations 9-12:

$$P\bigl(lacticacid \mid \text{formate}\bigr) = \left( \frac{P(\text{formate} \mid lacticacid)P(lacticacid)}{P(\text{formate})} \right) \quad (9)$$

$$= \frac{0.8 \times 0.5}{0.5}$$

$$= 0.8$$

-continued $$P\bigl(HClacid \mid \text{formate}\bigr) = \left( \frac{P(\text{formate} \mid HClacid)P(HClacid)}{P(\text{formate})} \right) \quad (10)$$

$$= \frac{0.2 \times 0.5}{0.5}$$

$$= 0.02$$

$$P\bigl(lacticacid \mid CaCo_3\bigr) = \left( \frac{P(CaCo_3 \mid lacticacid)P(lacticacid)}{P(CaCo_3)} \right) \quad (11)$$

$$= \frac{0.8 \times 0.5}{0.5}$$

$$= 0.8$$

$$P\bigl(HClacid \mid CaCo_3\bigr) = \left( \frac{P(CaCo_3 \mid HClacid)P(HClacid)}{P(CaCo_3)} \right) \quad (12)$$

$$= \frac{0.2 \times 0.5}{0.5}$$

$$= 0.2$$

The results of the calculations shown above in Equations 5-12 are depicted in table 1100 in FIG. 11. Table 1100 depicts the Bayesian probability determinations for treating fluids 1102 ("Lactic acid") and 1104 ("HCl acid") and swelling packers 1106 ("water swelling packer") and 1108 ("oil swelling packer"). The Bayesian probability determinations are shown for both a formate drilling fluid type 1110 and CaCO$_3$ drilling fluid type 1112.

After determining the Bayesian probabilities described above, the BDN model 400 may be used to select a swelling packer based on the inputs provided to the uncertainty nodes of the model 400. For example, the BDN model 400 may be used with two different interpretations of the output to provide the optimal swelling packer for the inputs provided to the model 400. In one interpretation, the model 400 may receive a user selection of an input for one uncertainty node, and an optimal swelling packer may be determined based on the possible inputs to the other uncertainty node. Thus, as shown table 1100 and FIG. 11, the drilling types 1110 and 1112 may be "Selected by user." By specifying a type of drilling fluid, the respective Bayesian probability determinations may be read from the table 1100.

FIG. 12 depicts a table 1200 illustrating the consequences for a user selection of a CaCO$_3$ drilling fluid type based on the Bayesian probability determinations depicted in FIG. 11. For example, if a CaCO$_3$ drilling fluid type is used to drill a well, the consequences of using a water swelling packer 1202 or an oil swelling packer 1204 are depicted in table 1200. The consequences illustrated in table 1200 may include a "Recommended" consequence 1206 and a "Not Recommended" consequence 1208. Accordingly, for a user selection of a CaCO$_3$ drilling fluid type, the Bayesian probabilities read from table 1100 for a water swelling packer are 0.6923 for a lactic acid and 0.3076 for an HCl acid treating fluid. Similarly, values for a user selection of a CaCO$_3$ drilling fluid type and an oil swelling packer are 0.8 and 0.2. As shown in FIG. 12, the Bayesian probability determinations greater than 50% (0.5) may be provided as Recommended consequences 1206 and the Bayesian probability determinations less than 50% (0.5) may be included as Non Recommended consequences 1208.

As mentioned above, table 900 of FIG. 9 depicts input utility values associated with Recommended and Not Recommended consequences. As shown in this table, a Recommended consequence has an input utility value of 1 and a Not Recommended consequence has an input utility value of 0. By combining the input utility values and the Bayesian probabilities depicted in FIG. 12, the expected utility may be calculated according to Equation 13:

$$Expectedutiilty = \sum_{i=1}^{n} consequence result \times inpututility value \quad (13)$$

Where:
Expectedutility is the expected utility value;
Consequence result is the Bayesian probability value associated with a consequence;
Inpututilityvalue is the input utility value associated with a consequence; and
n is the total number of consequences.

Accordingly, based on the input utility values depicted in FIG. 9 and the Bayesian probabilities depicted in FIG. 12, the expected utility value may be calculated using Equation 13. For example, for a user selection of a $CaCO_3$ drilling fluid type, the Bayesian probability associated with the Recommended consequence is 0.6923 (table 1100 in FIG. 11) and the input utility value associated with the Recommended consequence is 1 (table 900 in FIG. 9). Similarly, for a user selection of a $CaCO_3$ drilling fluid type, the Bayesian probability associated with the Recommended consequence is 0.3076 (table 1100 in FIG. 11) and the input utility value associated with the Recommended consequence is 0 (table 900 in FIG. 9). The calculation of the expected utility for a water swelling packer and a user selection of a $CaCO_3$ drilling fluid type is illustrated below in Equation 14:

$$Expectedutiilty = \sum_{i=1}^{n} consequence result \times inpututility value = \quad (14)$$
$$0.6923 \times 1 + 0.3076 \times 0 = 0.6923$$

The calculation the expected utility of the expected utility for an oil swelling packer and a user selection of a $CaCO_3$ drilling fluid type is illustrated below in Equation 15:

$$Expectedutiilty = \quad (15)$$
$$\sum_{i=1}^{n} consequence result \times inpututility value = 0.8 \times 1 + 0.2 \times 0 = 0.8$$

The results of the calculations performed in Equations 14 and 15 are summarized in FIG. 13. FIG. 13 depicts a table 1300 showing the expected utility 1302 calculated above. As shown in this figure, the expected utility 1302 for a water swelling packer 1304 is 0.6293 (Equation 14), and the expected utility 1302 for an oil swelling packer 1306 is 0.8 (Equation 15). Thus, after inputting a drilling fluid type in the drilling fluid uncertainty node 406 in the BDN model 400, the BDN model 400 may output these expected utility values for the swelling packers associated with the swelling packer decision node 402. Based on these expected utility values, a user may select an optimal swelling packer for use with the selected drilling fluid type. For example, a user may select the swelling packer with the higher expected utility value, i.e., the oil swelling packer. That is, as shown in table 1300 of FIG. 13, the expected utility value of 0.8 associated with the oil swelling packer is greater than the expected utility value of 0.6923 associated with the water swelling packer.

In other interpretations, a user may input values for all of the uncertainty nodes of the BDN model 400 to determine the optimal selection of a swelling packer. In such instances, the consequences may be determined directly from the consequences node 408 of the BDN model 400, as depicted above in table 800 of FIG. 8. For example, a user may select inputs for the treating fluid uncertainty node 404 and the drilling fluid type uncertainty node 406 of the BDN model 400. Accordingly, FIG. 14 depicts a table 1400 showing the consequences for different swelling packers based on a user selection of a formate drilling fluid type and a lactic acid treating fluid. As shown in FIG. 14, the consequences may include a "Recommended" consequence 1402 and a "Not Recommended" consequence 1404 for both a water swelling packer 1406 and an oil swelling packer 1408. For a user selection of a formate drilling fluid type and a lactic acid treating fluid, table 800 of FIG. 8 shows a Recommended consequence value of 0 Not Recommended consequence value of 1 for a water swelling packer. Accordingly, the table 1400 shows that the water swelling packer 1406 has a Recommended consequence value of 0 and a Not Recommended consequence value of 1. Similarly, for a user selection of a formate drilling fluid type and a lactic acid treating fluid, table 800 of FIG. 8 shows a Recommended consequence value of 1 and a Not Recommended consequence value of 0 for an oil swelling packer. Thus, the table 1400 shows that the oil swelling packer 1408 has a Recommended consequence value of 1 and a Not Recommended consequence value of 0.

Based on the consequences described above, the expected utility for the different swelling packers may be determined using Equation 13 described above. For example, based on table 1400 of FIG. 14, the calculation of the expected utility for a water swelling packer is illustrated below in Equation 16:

$$Expectedutiilty = \quad (16)$$
$$\sum_{i=1}^{n} consequence result \times inpututility value = 0 \times 1 + 1 \times 0 = 0$$

Similarly, the calculation of the expected utility for an oil swelling packer, using the values for consequences shown in table 1400 of FIG. 14, is illustrated below in Equation 17:

$$Expectedutiilty = \quad (17)$$
$$\sum_{i=1}^{n} consequence result \times inpututility value = 1 \times 1 + 0 \times 0 = 0$$

Figure 15:
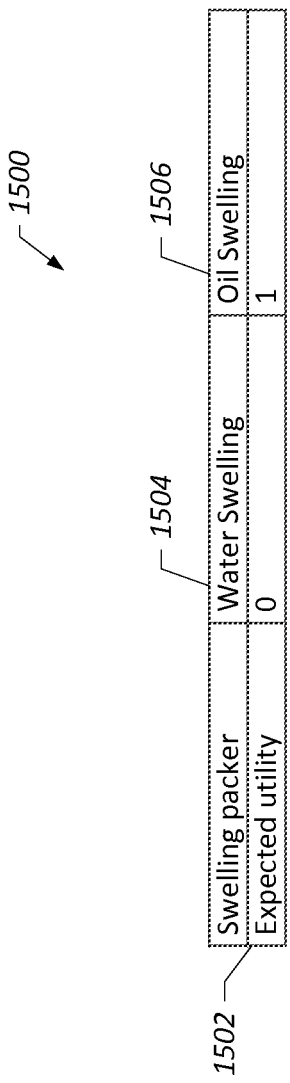
FIG. 15 is a table of expected utilities based on the consequences depicted in FIG. 14.

FIG. 15 depicts a table 1500 illustrated the results of the calculations performed above in Equations 16 and 17. An expected utility 1502 for a water swelling packer 1504 and an oil swelling packer 1506 is illustrated in table 1500. Based on a user selection of a formate drilling fluid type and a lactic acid treating fluid, an expected utility value for the water swelling packer 1504 is 0 and the expected utility value for the oil swelling packer 1506 is 1. Based on these values, a user may select a swelling packer for use based on the BDN model 400. For example, a user may select the swelling packer with the higher expected utility value in table 1500, i.e., an oil swelling packer. Here again, a user may select an optimal swelling packer for use with the inputs, i.e., a selected treating fluid and drilling fluid type, provided to the BDN model 400. For example, a user may select the swelling packer with the higher expected utility value, i.e., the oil swelling packer. That is, as shown in table 1500 of FIG. 15, the expected utility value of 1 associated with the oil swelling packer is greater than the expected utility value of 0 associated with the water swelling packer.

Figure 16A:
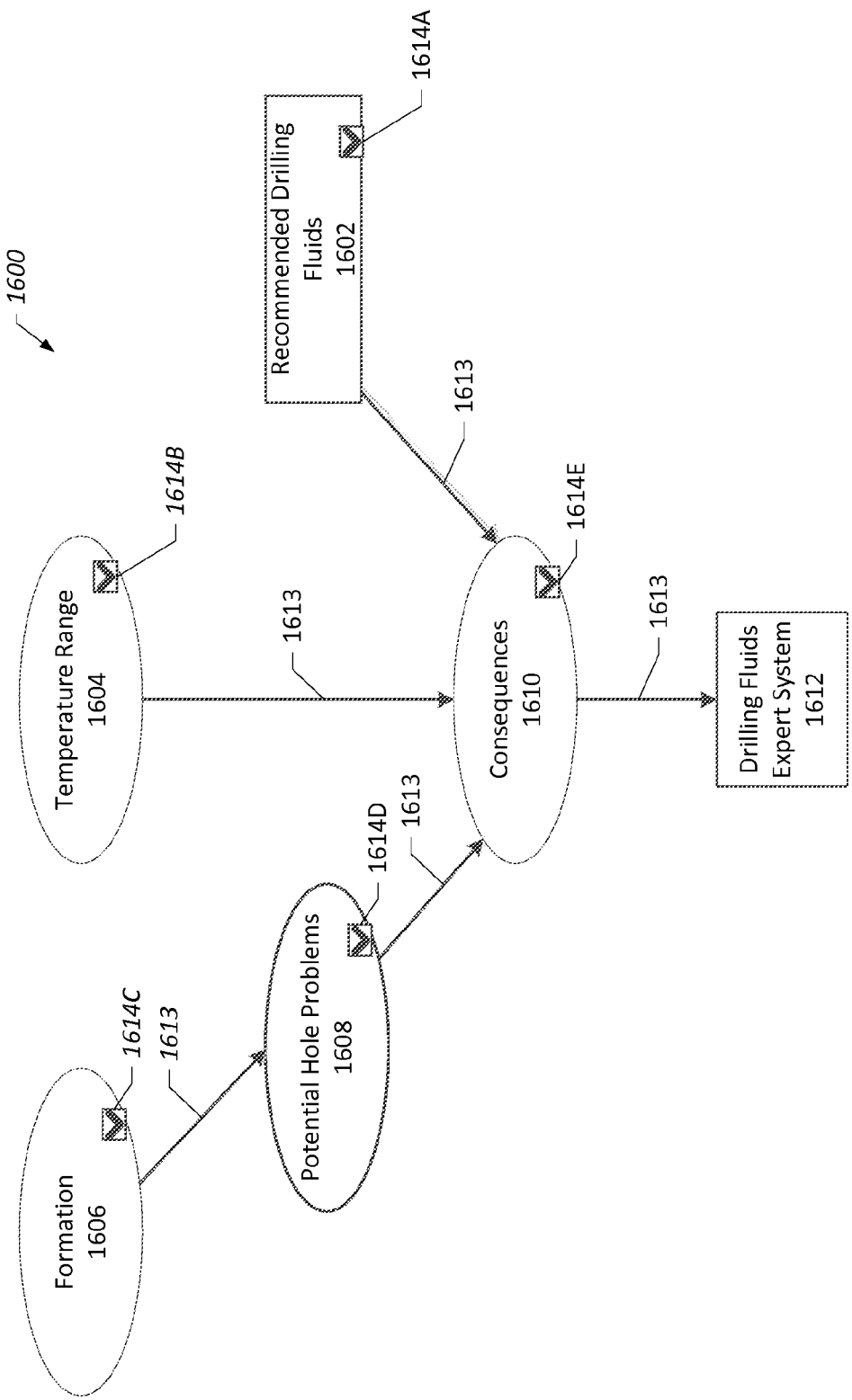
FIGS. 16A-16G depicts a drilling fluids Bayesian decision network (BDN) model and various user selected inputs to the drilling fluids BDN model in accordance with an embodiment of the present invention.

In view of the techniques described above, a BDN model may be applied to more complicated determinations. Such models may serve as a training tool or a guide to aid engineers, scientists, or other users in selecting and executing operations of the drilling system 106. In such embodiments, a BDN model may be used to create drilling fluids expert system used for selecting a drilling fluid for use in the drilling system 106, as described above in FIGS. 1-3. Accordingly, FIG. 16A depicts an example of a drilling fluids BDN model 1600 for determining an optimal drilling fluid formulation based on selected inputs in accordance with an embodiment of the present invention. The BDN model 1600 depicted in FIG. 16A includes a recommended fluids decision node 1602, a temperature range uncertainty node 1604, a formation uncertainty node 1606, a potential hole problems uncertainty node 1608, a consequences node 1610, and a drilling fluids expert system utility node 1612. The connection lines 1613 indicate the relationships between the nodes of the BDN model 1600. As shown in the BDN model 1600, the potential hole problems uncertainty node 1608 is influenced by the inputs to the formation uncertainty node 1606. The potential hole problems uncertainty node 1608 may be referred to as a child node of the formation uncertainty node 1606. In the BDN model 1600, the consequences node 1610 may be affected by the selections of a temperature range via the temperature range uncertainty node 1604, a formation via the formation uncertainty node 1606, and a potential hole problem via the potential hole problem uncertainty node 1608. As described further below, the BDN model 1600 for drilling fluids may be developed from literature review and drilling fluids expert's opinions.

In some embodiments, the BDN model 1600 may be implemented in a user interface, such as the user interface 206 of the drilling fluids expert system 202, that displays a representation of the model 1600 in FIG. 16A. Thus, while the BDN model 1600 illustrates the logical relationship of the nodes of the model 1600, it may also provide a visual depiction of the model 1600 for use in a user interface. In such embodiments, for example, each node of the model 1600 may include a button 1614 that enables a user to select a value for the node or see the determinations performed by a node. For example, as described below, a user may select (e.g., click) the button 1614B to select a temperature range input for the model 1600, select the button 1614C to select (e.g., click) a formation input for the model 1600, and so on.

Figure 16B:
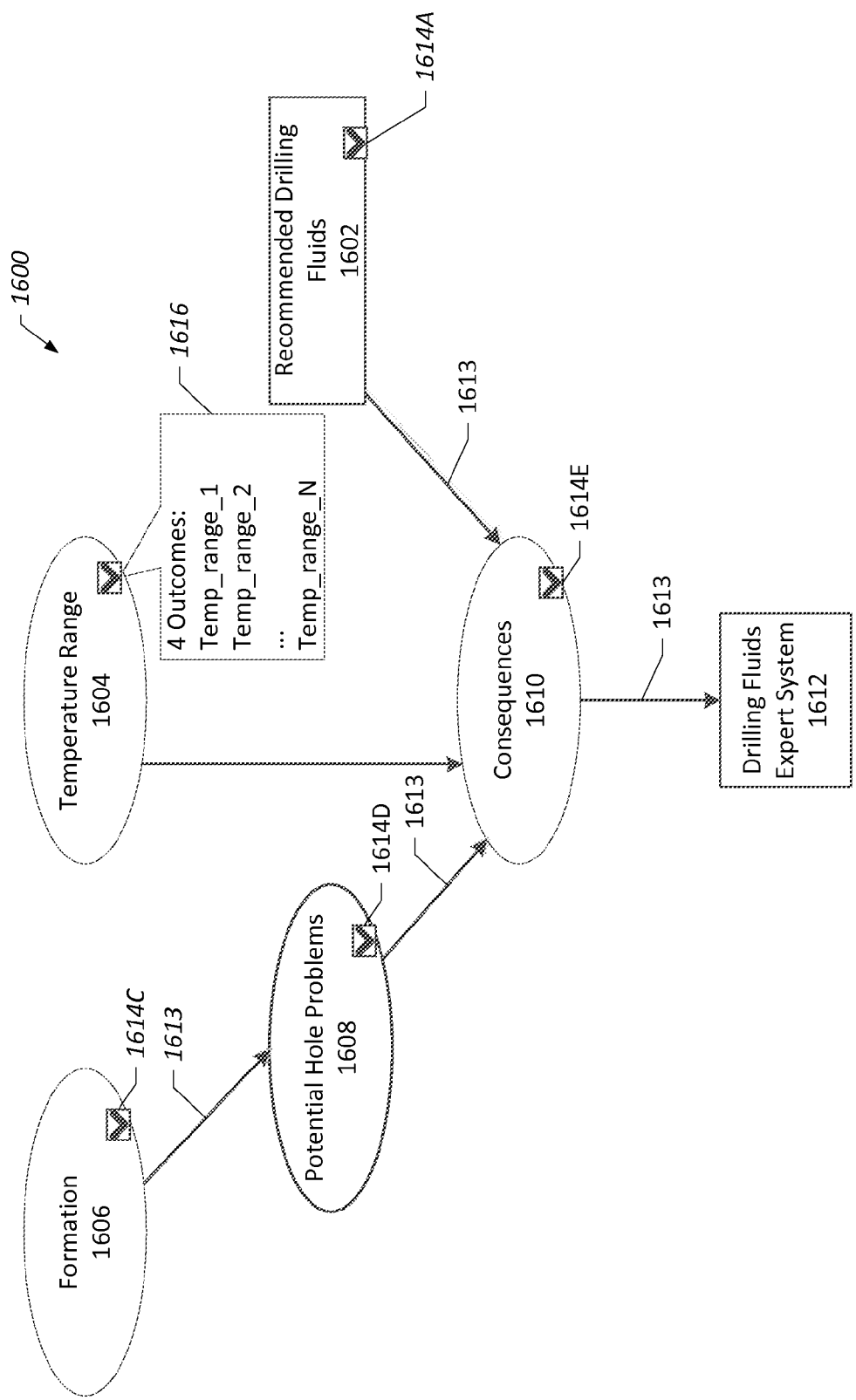
Figure 16C:
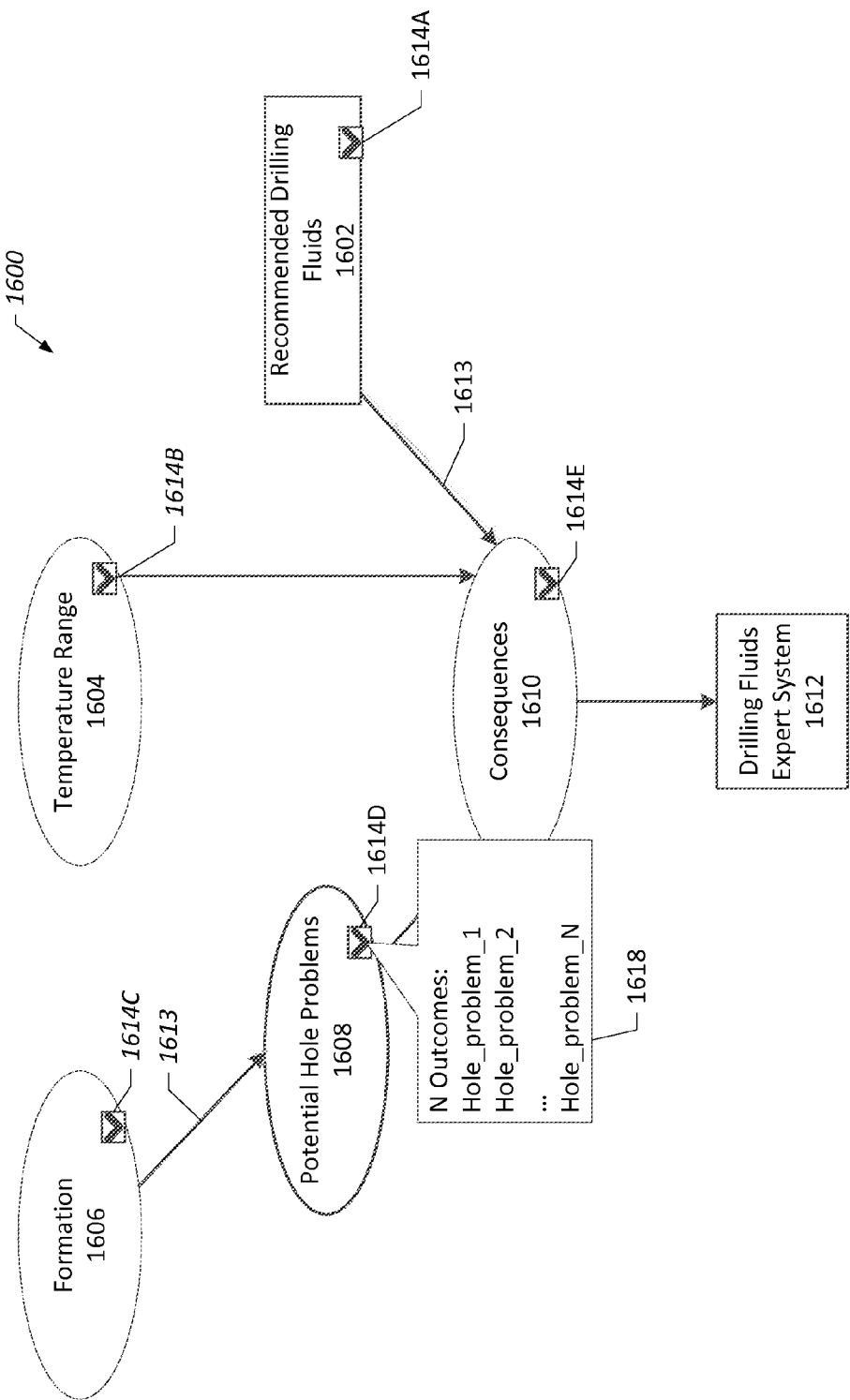
Figure 16D:
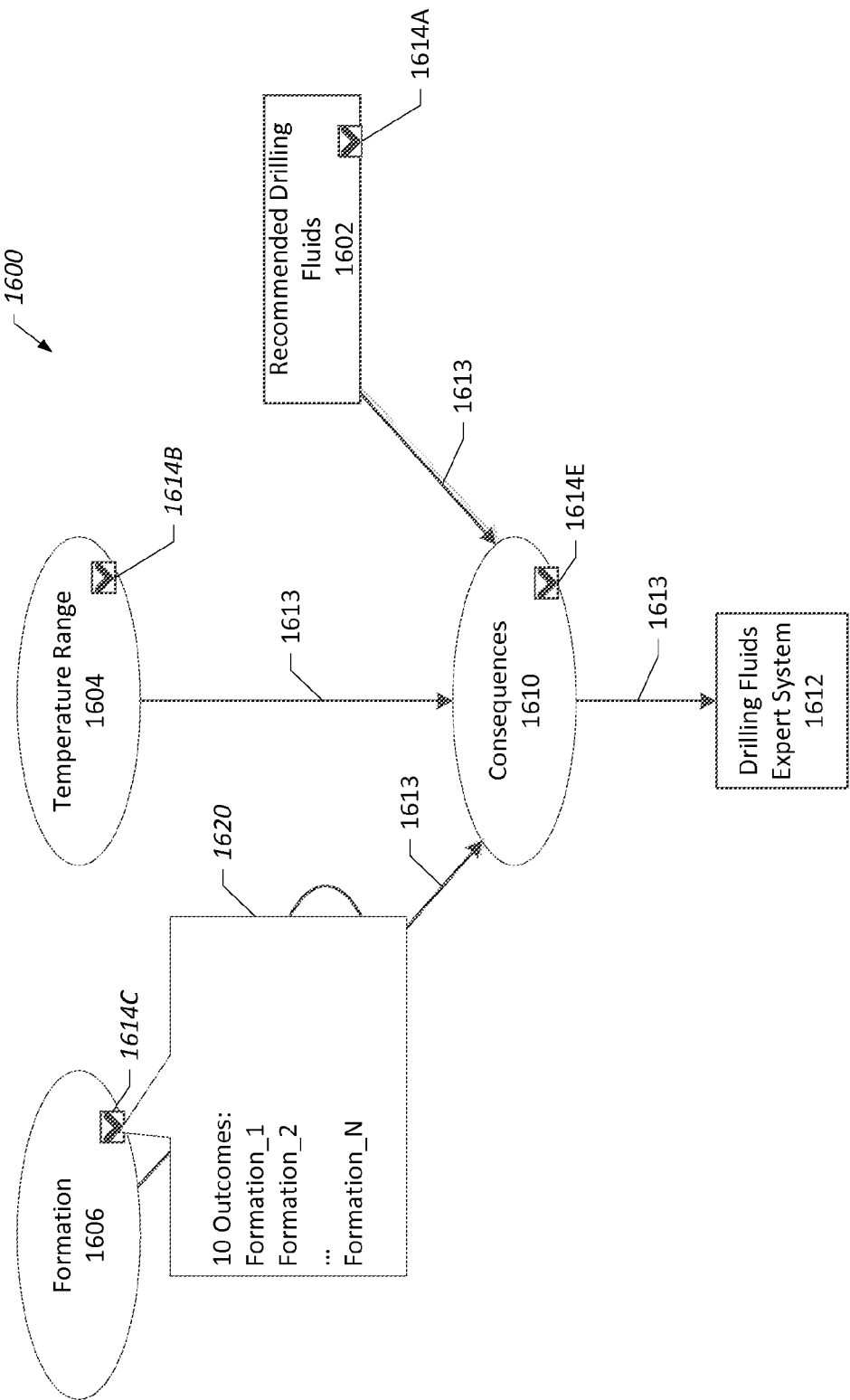

FIGS. 16B-16D depict the inputs for each node of the BDN model 1600 in accordance with an embodiment of the present invention. FIG. 16B depicts inputs 1616 for the temperature range uncertainty node 1604. The inputs 1616 may be temperature ranges and may include N number of inputs from "temp_range_1" to "temp_range_N." For example, in some embodiments, the inputs 1616 may include: "Less_than_120 F"; "120_to_220 F"; "220_to_330 F"; and "330_to_400 F." As will be appreciated, in some embodiments the inputs 1616 may include associated probabilities, such as probabilities $p\_1$ through $p\_N$. The temperature ranges used may be provided in any suitable units, such as Fahrenheit, Celsius, or Kelvin. The inputs 1616 may be provided in a dialog window, a dropdown list, or other element of a user interface. The inputs 1616 for the temperature range uncertainty node 1404 may be based on actual or projected operating temperatures for a drilling system, i.e., the temperature ranges at which a drilling fluid will be used. For example, a user may monitor the drilling system 106 illustrated in FIG. 1 and determine the operating temperature ranges. Alternatively, the temperature ranges may be determined from computer estimations, such as simulations of existing or virtual drilling systems.

FIG. 16C depicts inputs 1618 for the potential hole problems uncertainty node 1608 in accordance with an embodiment of the present invention. As shown in FIG. 16C, the inputs 1618 may include potential hole problems and may have N number of inputs from "hole_problem_1" to "hole_problem_N." In some embodiments, for example, the inputs 1618 may include: "Tight_hole_and_lost_circulation"; "Loss_of_circulation_and_hard_fractured_unstable_formation"; "Loss_of_circulation_and_water_flows"; "Tight_hole_problems"; "H2S_and_water_flow"; "Water_flow"; "Lost_circulation"; "Lost_circulation_and_water_flow_and_tight_hole"; "Water_hydrocarbon_and_H2S_flows"; "Lost_circulation_and_H2S"; "Abnormal_pressure" "H2S", "Tight_hole_and_flow_and_abnormal_pressure", "Possible_ sticking_and_possible_flow"; "Possible_sloughing_and_slow_drilling_and_difficult_ directional_control_ due_hard_abrasive_sands"; "Possible_flow_and_H2S_and_possible_differential_sticking"; "Possible_flow_and_hard_drilling_and_coring_and_possible_loss_of_circulation"; and "Potential formation damage." As will be appreciated, in some embodiments the inputs 1618 may include associated probabilities, such as probabilities $p\_1$ through $p\_N$. In other embodiments, alternative or additional potential hole problems may be included as inputs 1618 in the drilling fluids BDN model 1600. The selectable potential hole problems 1618 may be provided in a dialog window, a dropdown list, or other element of a user interface. The inputs 1618 for the potential hole problems uncertainty node 1608 may be based on potential hole problems for the various formations included in the formation uncertainty node 1606.

FIG. 16D depicts inputs 1620 for the formation uncertainty node 1606 in accordance with an embodiment of the present invention. The inputs 1618 may include different formation lithologies, such as oil fields, and may include N number of inputs from "formation_1" to "formation_N." As will be appreciated, in some embodiments the inputs 1620 may include associated probabilities, such as probabilities $p\_1$ through $p\_N$. The inputs 1620 may be names of specific formations, such as the names of specific oil fields, or the names of general formation lithologies. The inputs 1620 may be provided in a dialog window, a dropdown list, or other element of a user interface.

Figure 16E:
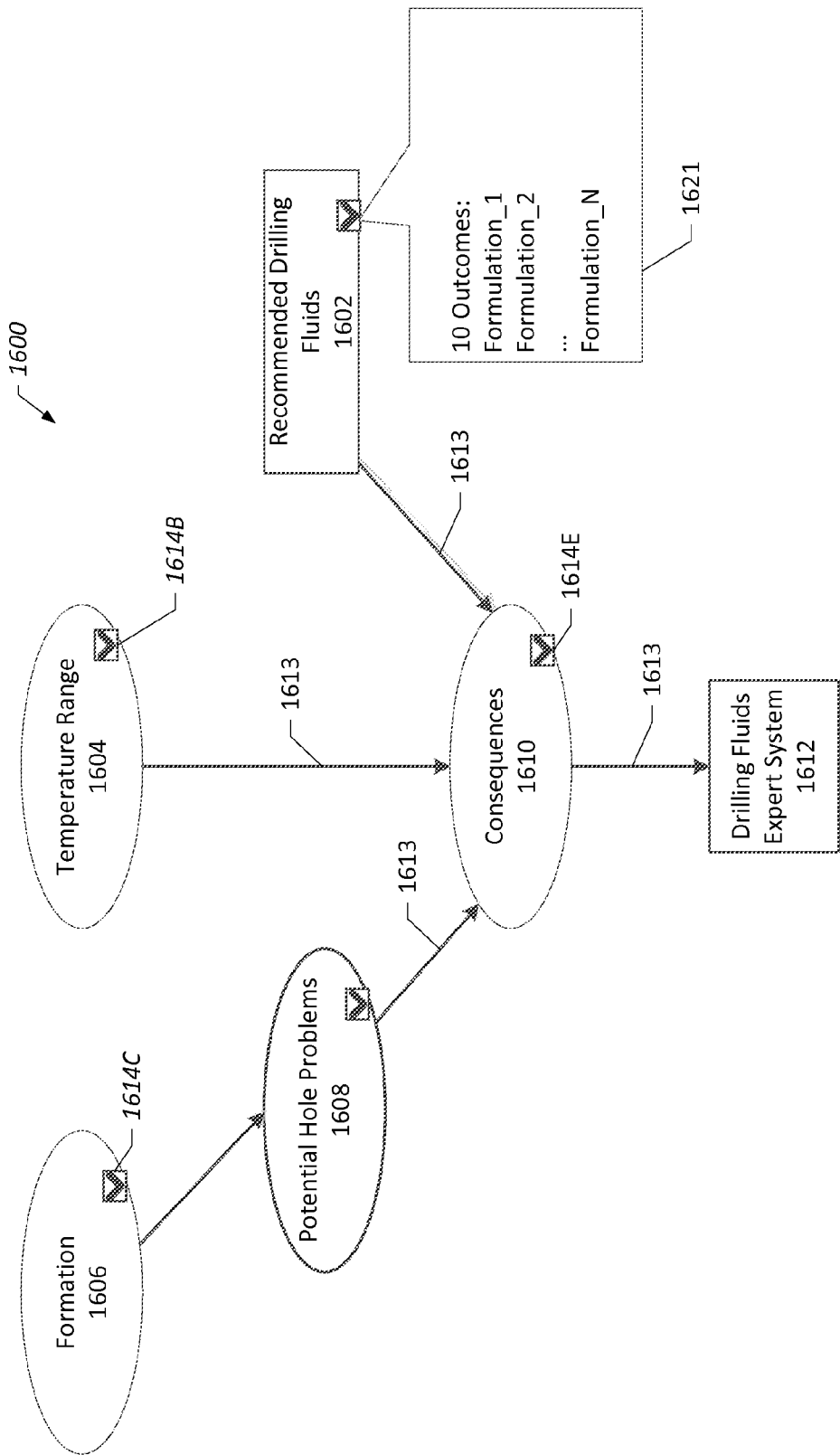

Finally, inputs may be provided via the drilling fluids decision node 1602. FIG. 16E depicts inputs 1621 for the drilling fluids decision node 1602 in accordance with an embodiment of the present invention. As shown in FIG. 16E, the inputs may include various drilling fluid formulations and may have N number of inputs from "formulation_1" to "formulation_N."

A user may interact with the drilling fluids BDN model 1600 as part of a drilling fluids expert system, such as the drilling fluids expert system 202, to enter inputs at uncertainty nodes and receive outputs from the consequence node, such as recommended drilling fluid formulations. Each uncertainty node may include inputs having an associated probability distribution of probabilities. Additionally, a user may select a particular input for an uncertainty node such that a probability state of 1 is assigned to the selected input. Accordingly, the selected input may be the only input to the selected uncertainty node. FIGS. 16D-25 describe various inputs and the outputs of the BDN model 1600. A user may enter inputs at any node of the BDN model 1600. The BDN model 1600 may implement the BDN probability determinations described above in FIGS. 4-15 to determine Bayesian probabilities and expected utilities at the consequences node 1610.

Figure 16F:
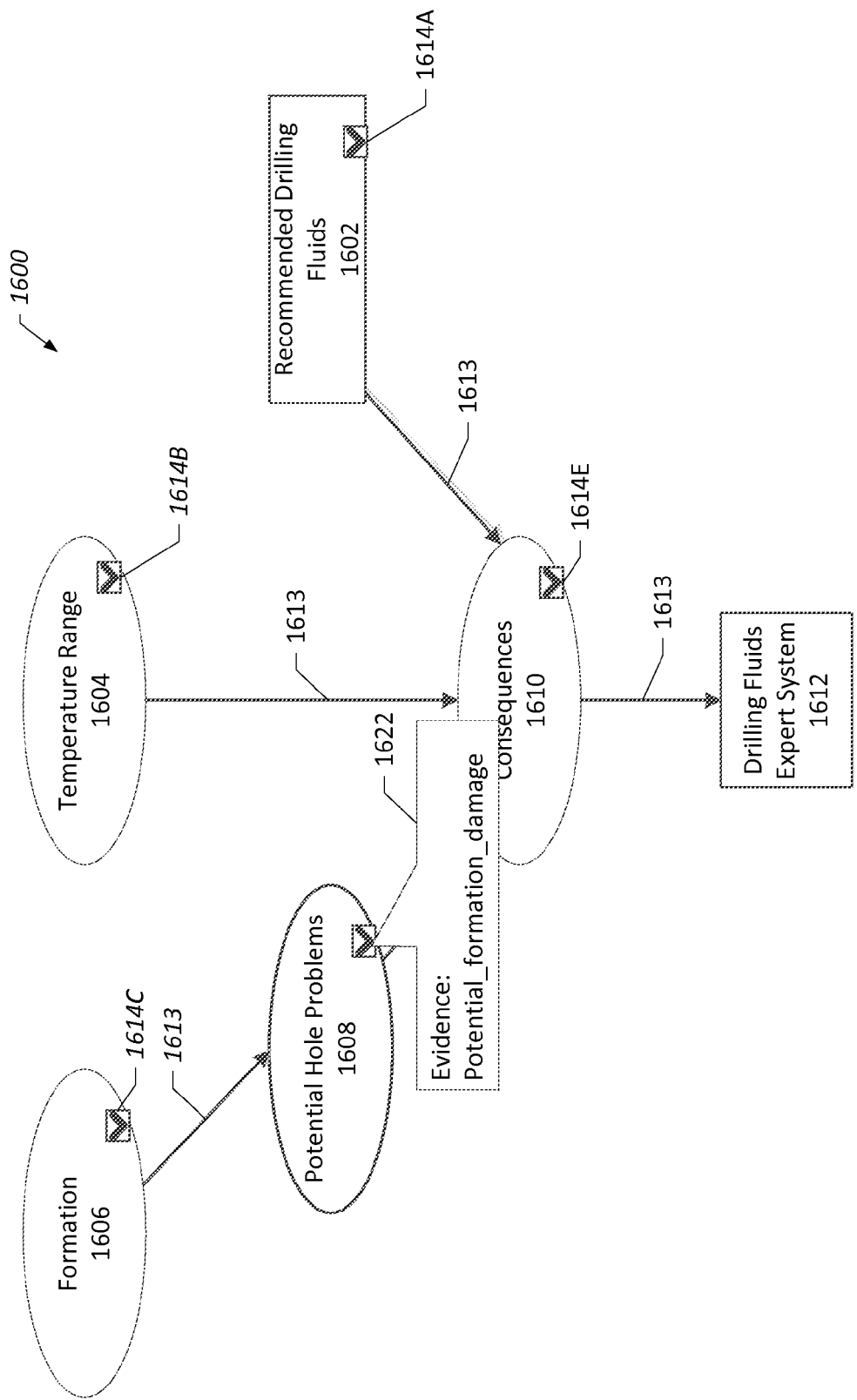
Figure 16G:
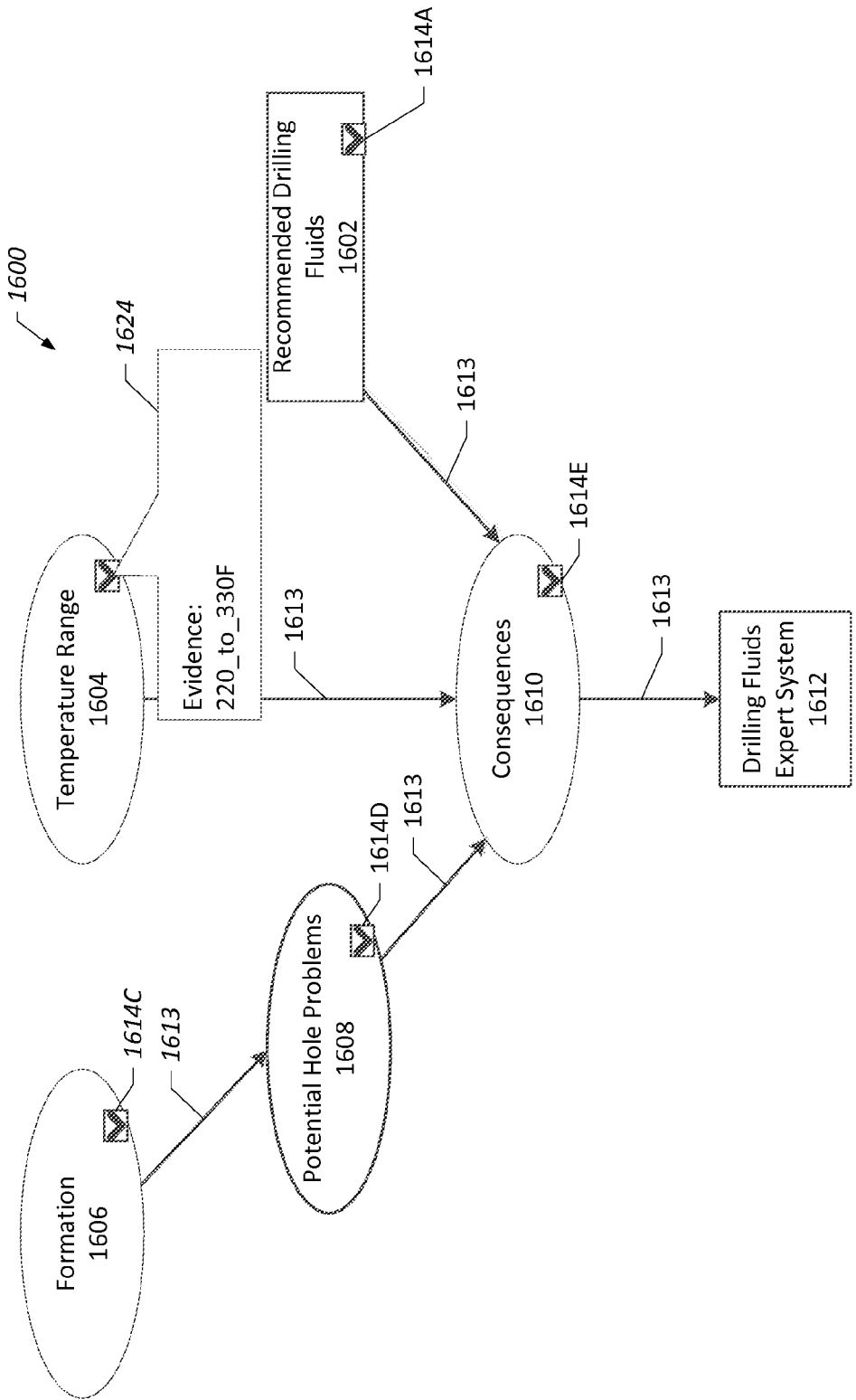

FIGS. 16F and 16G depict the entering of inputs at the uncertainty nodes 1608 and 1604. Accordingly, FIG. 16F depicts a user selected input 1624 for the potential hole problems uncertainty node 1608 in accordance with an embodiment of the present invention. A user may select (e.g., click) the button 1614C to display potential hole problems for the potential hole problems uncertainty node 608. A user may then select (e.g., click) the input 1624 for the node 1608. For example, as shown in FIG. 16F, a user may select the potential hole problem "Potential_formation_damage" from the input 1624. The input 1624 may be displayed to indicate the selected input to the potential hole problems uncertainty node 1608.

Next, a user may select inputs for other uncertainty nodes of the drilling fluids BDN model 1600. FIG. 16G depicts a user selected input 1626 for the temperature range uncertainty node 1604 in accordance with an embodiment of the present invention. A user may select the button 1614B to display temperature ranges for the temperature range uncertainty node 1604. The selected input 1624 ("220_to_330 F") may then be displayed in response to the user selection to indicate the selected input for the temperature range uncertainty node 1604.

Figure 17:
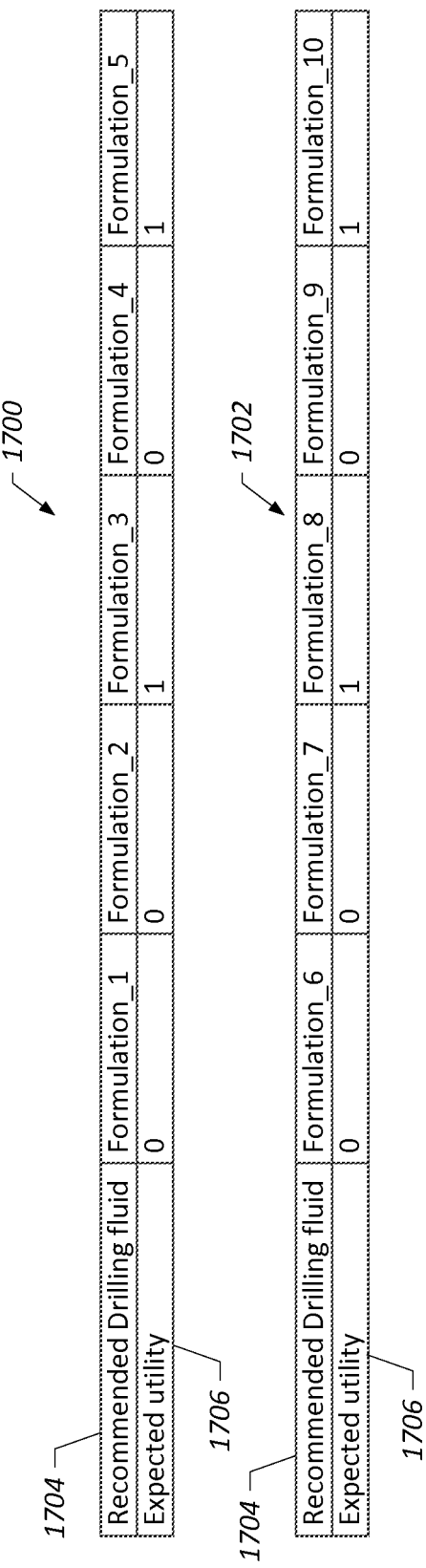
FIG. 17 is a table of expected utilities based on the consequences output by the drilling fluids BDN model of FIG. 16A in accordance with an embodiment of the present invention.

After selecting inputs for the nodes of the drilling fluids BDN model 1600, the selections may be propagated to the consequences node 1610 by performing the Bayesian probability determinations described above in Equation 1, 2, and 4. By using the probabilities assigned to each of the inputs, the drilling fluids BDN model 1600 may then provide recommendations based on the inputs from the nodes 1602, 1604, 1606, and 1608. As noted above, in some embodiments, the uncertainty nodes of the drilling fluids BDN model 1600 may have inputs with associated probabilities. A user may select an input for one or more uncertainty nodes and view the recommendations based on the propagation of the selected input. By using the probabilities states for each node, the drilling fluids BDN model 1600 may then provide the expected utility of various drilling fluid formulations as described above in Equation 13. As shown above, the expected utility may then enable a determination of Recommended and Not recommended drilling fluid formulations. For example, a user may select (e.g., click) the consequences node 1610 to receive the recommendations of the user selected inputs. FIG. 17 depicts output from the drilling fluids BDN model 1600 based on the selections described above in FIGS. 16E and 16F in accordance with an embodiment of the present invention. As shown in FIG. 17, in some embodiments the output may be presented as tables 1700 and 1702 displaying an expected utility 1704 for multiple recommended drilling fluids formulations 1706 (e.g., "Formulation_1" to "Formulation_10").

The tables 1700 and 1702 may display an expected utility value determined according to the techniques described above and calculated by Equations 13. For example, the selected inputs and probability states of the uncertainty nodes of the drilling fluids BDN model 1600 may be used to determine the consequences via the consequences uncertainty node 1610. Based on the results, recommended drilling fluid formulations may be determined and expected utility values may be calculated. As shown in FIG. 17, for example, based on the selected inputs entered into the BDN model 1600, the drilling fluids "Formulation_3", "Formulation_5," and "Formulation_10" may have an expected utility value of 1. In contrast, the other drilling fluids included in tables 1700 and 1702, such as "Formulation_1," "Formulation_2," "Formulation_4" and so on, may have an expected utility value of 0. Accordingly, a user may choose to use drilling fluids "Formulation_3", "Formulation_5," or "Formulation_10" in a drilling system characterized by the selected inputs.

Figure 18A:
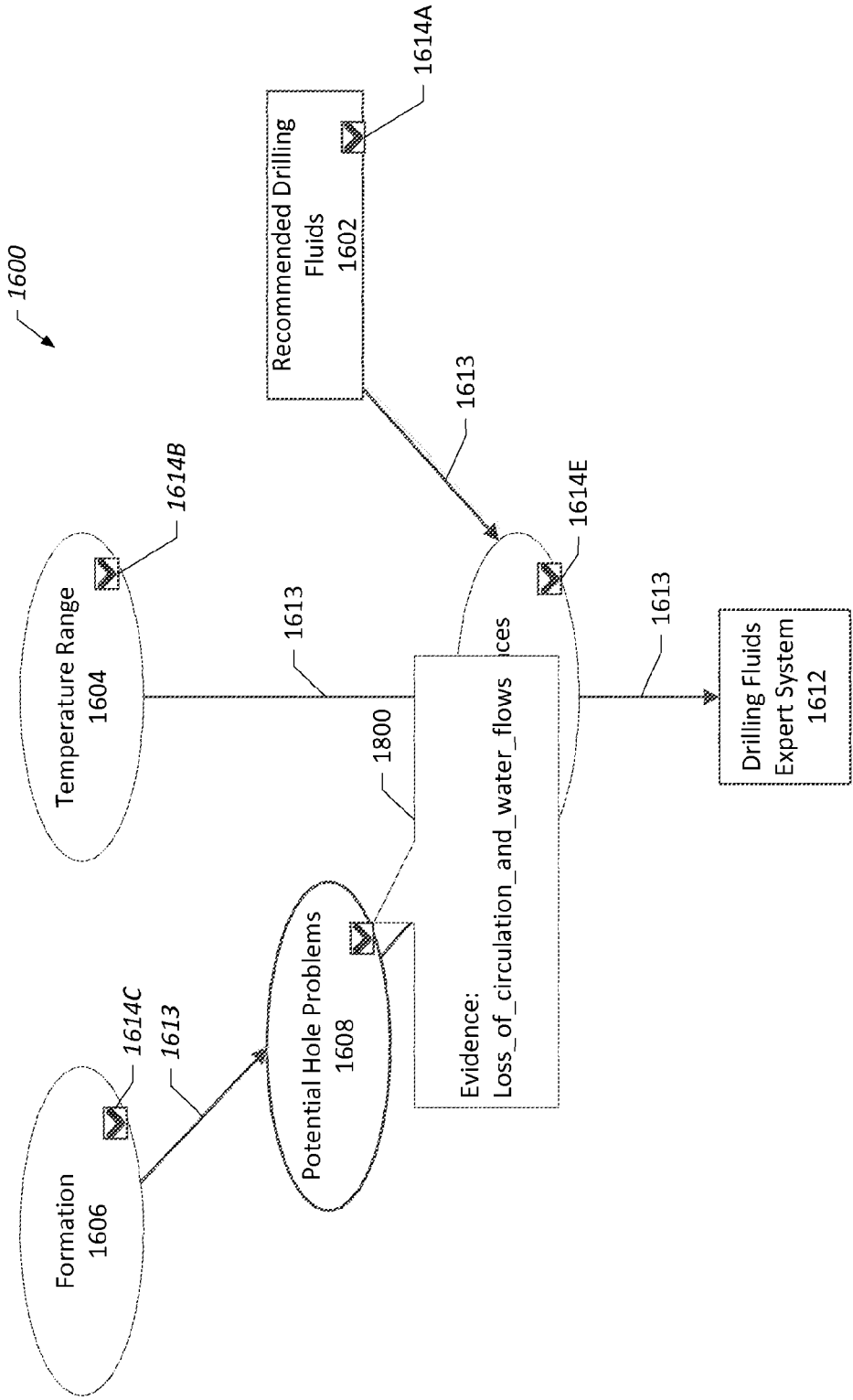
FIGS. 18A and 18B depict the drilling fluids BDN model of FIG. 16A and various user selected inputs in accordance with an embodiment of the present invention.
Figure 18B:
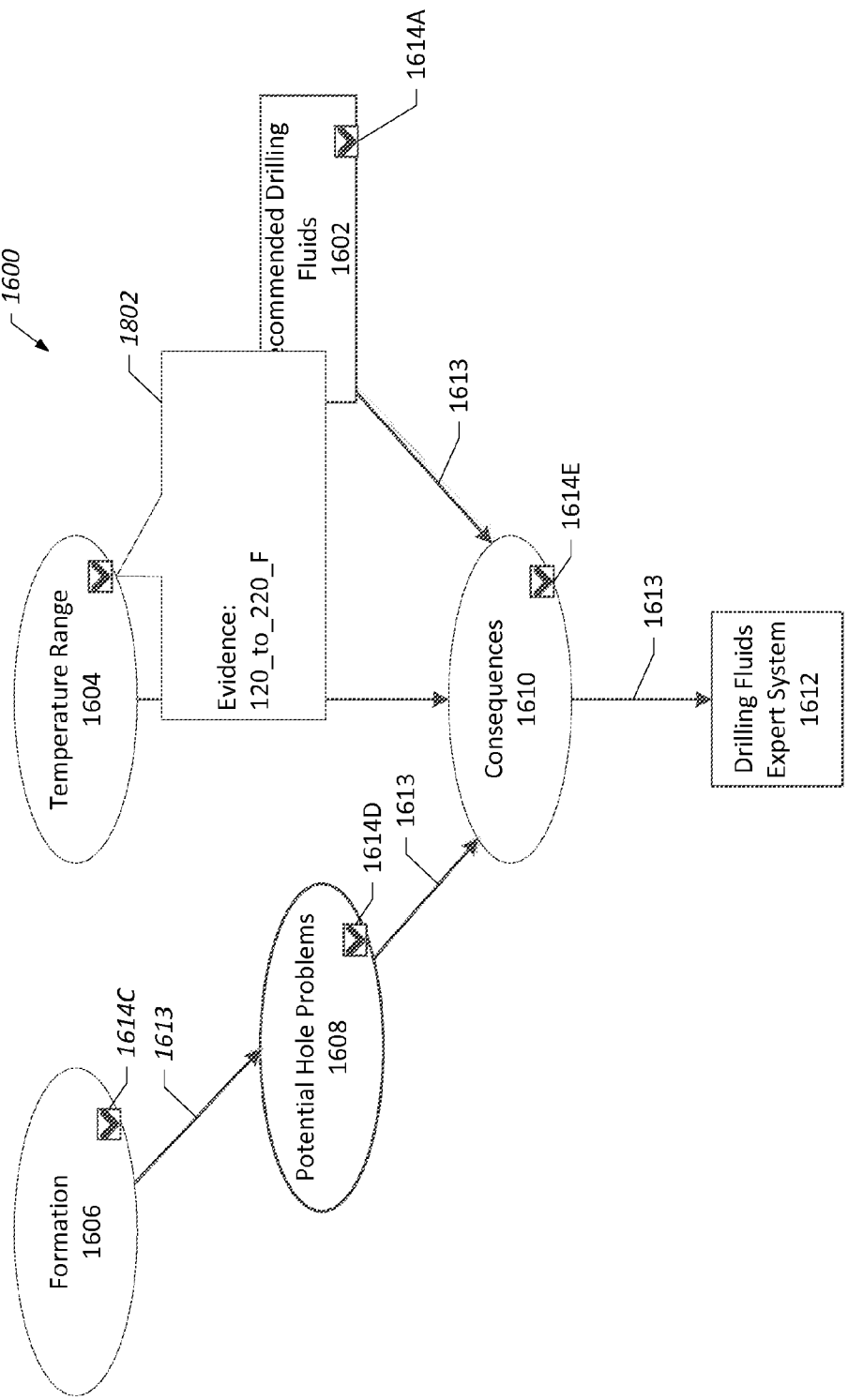
Figure 19:
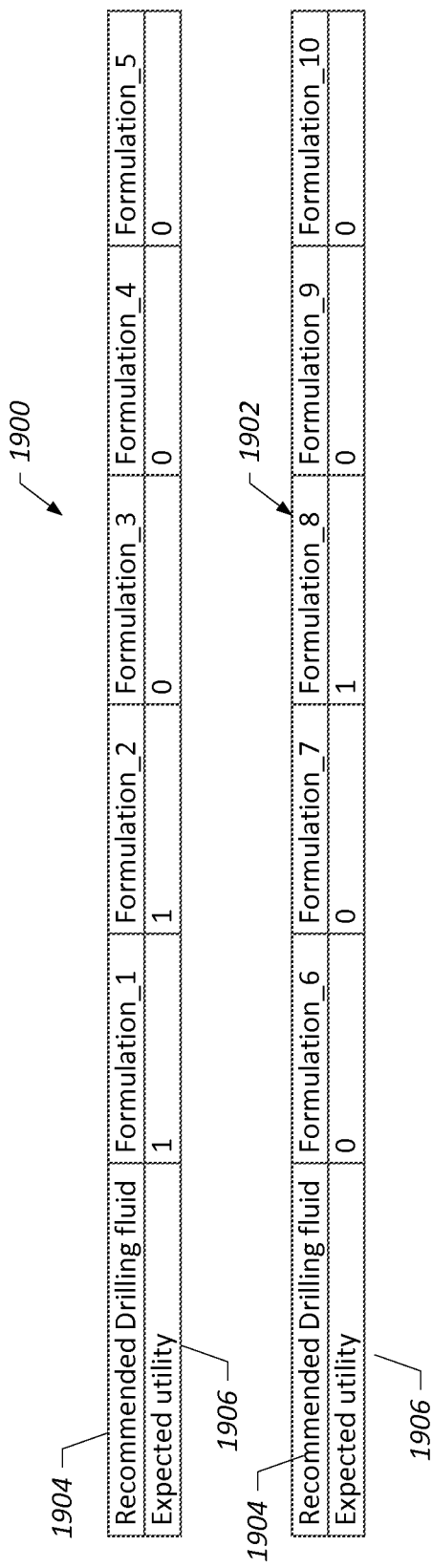
FIG. 19 is a table of expected utilities based on the consequences output by the drilling fluids BDN model of FIG. 16A in accordance with an embodiment of the present invention.

If a user selects different inputs to some or all of the uncertainty nodes of the BDN model 1600, a different output may be produced by the BDN model 1600. FIGS. 18 and 19 depict another determination of the drilling fluids BDN model 1600 based on different user selected inputs entered into the potential hole problems uncertainty node 1608 and the temperature range uncertainty node 1604. As shown in FIG. 18A, a user may select a different input for the potential hole problems uncertainty node 1608, such as by selecting (e.g., clicking) the button 1614C. The selected input 1800 ("Loss_of_circulation_and_water_flows") may be displayed to indicate the input to the selected hole problem uncertainty node 1608. Similarly, in FIG. 18B, a user may select a temperature ranges as an input 1802, such as by selecting (e.g., clicking) the button 1614B of the temperature range uncertainty node 1604. The input 1802 ("120 to 220 F") may be displayed to indicate the input to the temperature range uncertainty node 1604.

As explained above, after entering inputs to the uncertainty nodes 1604 and 1608 of the model 1600, a user may select (e.g., click) the drilling fluids expert node 1612 to view the output determined by the drilling fluids BDN model 1600. FIG. 19 depicts the output from the drilling fluids BDN model 1600 based on the selected inputs described above in FIGS. 18A and 18B and in accordance with an embodiment of the present invention. As shown in FIG. 19, in some embodiments the output from the drilling fluids BDN model 1600 may be presented as tables 1900 and 1902 that display an expected utility 1904 for multiple recommended drilling fluid formulations 1906 (e.g., "Formulation_1" to "Formulation_10").

Here again, the drilling fluids BDN model 1600 may calculate the expected utility values according determination illustrated in Equation 13 and described above. The recommended drilling fluids may be then determined and displayed in the tables 1900 and 1902. As shown in FIG. 19, for example, based on the selected inputs depicted in FIGS. 18A and 18B, the drilling fluids "Formulation_1", "Formulation_2," and "Formulation_8" may have an expected utility value of 1. In contrast, the other drilling fluids included in tables 1900 and 1902, such as "Formulation_3," "Formulation_4," "Formulation_5" and so on, may have an expected utility value of 0. Accordingly, a user may choose to use drilling fluids "Formulation_1", "Formulation_2," or "Formulation_8" in a drilling system characterized by the additional inputs described above in FIGS. 18A and 18B.

Figure 20A:
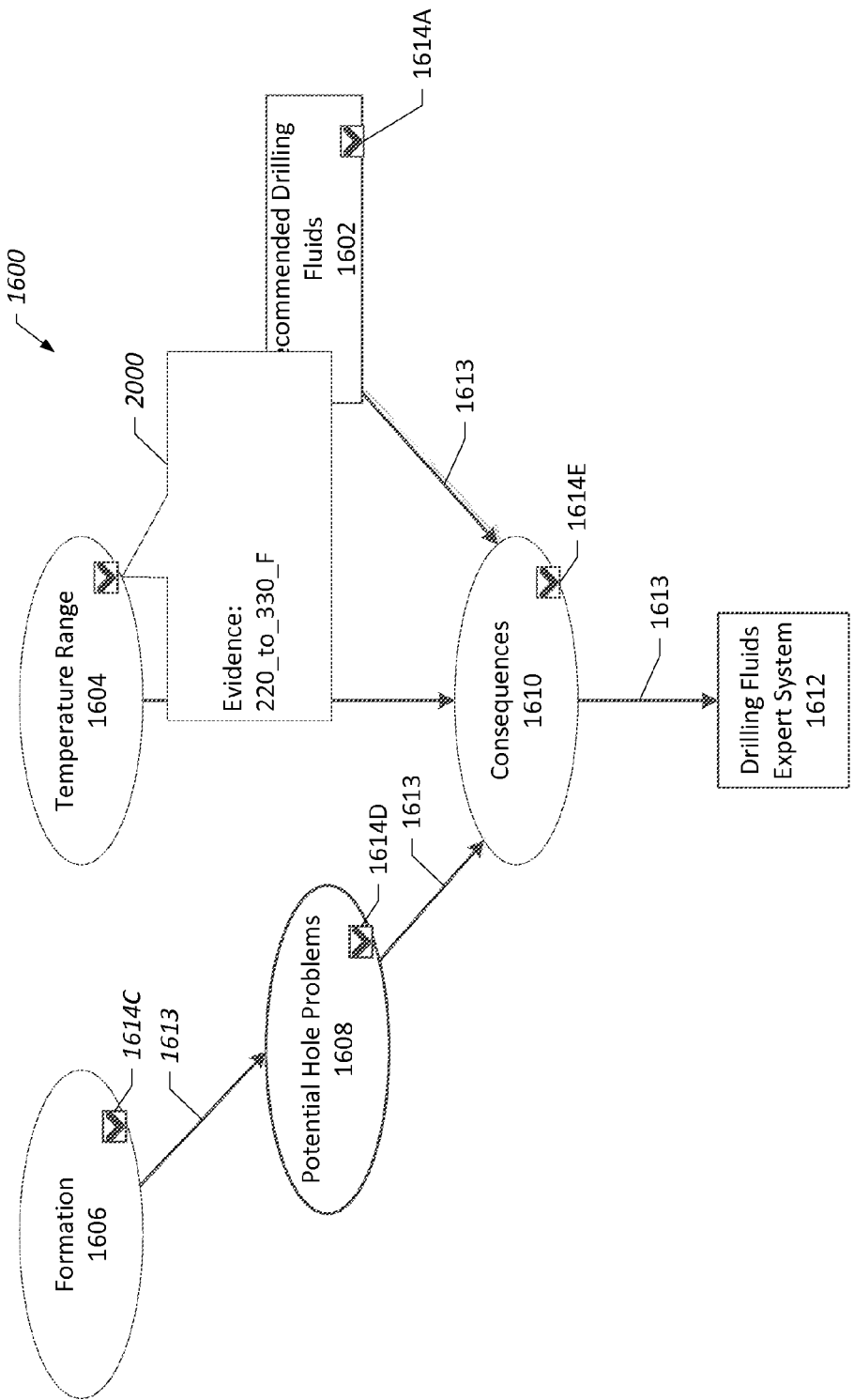
FIGS. 20A-20C depict the drilling fluids BDN model of FIG. 16A and various user selected inputs in accordance with an embodiment of the present invention.

As noted above, inputs to the drilling fluids BDN model 1600 may be entered at any node of the BDN model 1600. Accordingly, if a user of the drilling fluids expert system only knows a temperature range and a formation, a user may use the drilling fluids BDN model 1600 by entering an input to the temperature range uncertainty node 1604 and the formation uncertainty node 1606, as shown below in FIGS. 20A and 20B. For example, as shown in FIG. 20A, a user may select a temperature range for the uncertainty node 1604 by selecting (e.g., clicking) the button 1614B of the temperature range uncertainty node 1604. The selected input 2000 ("200_to_330 F") may be displayed to indicate the input to the uncertainty node 1604.

Figure 20B:
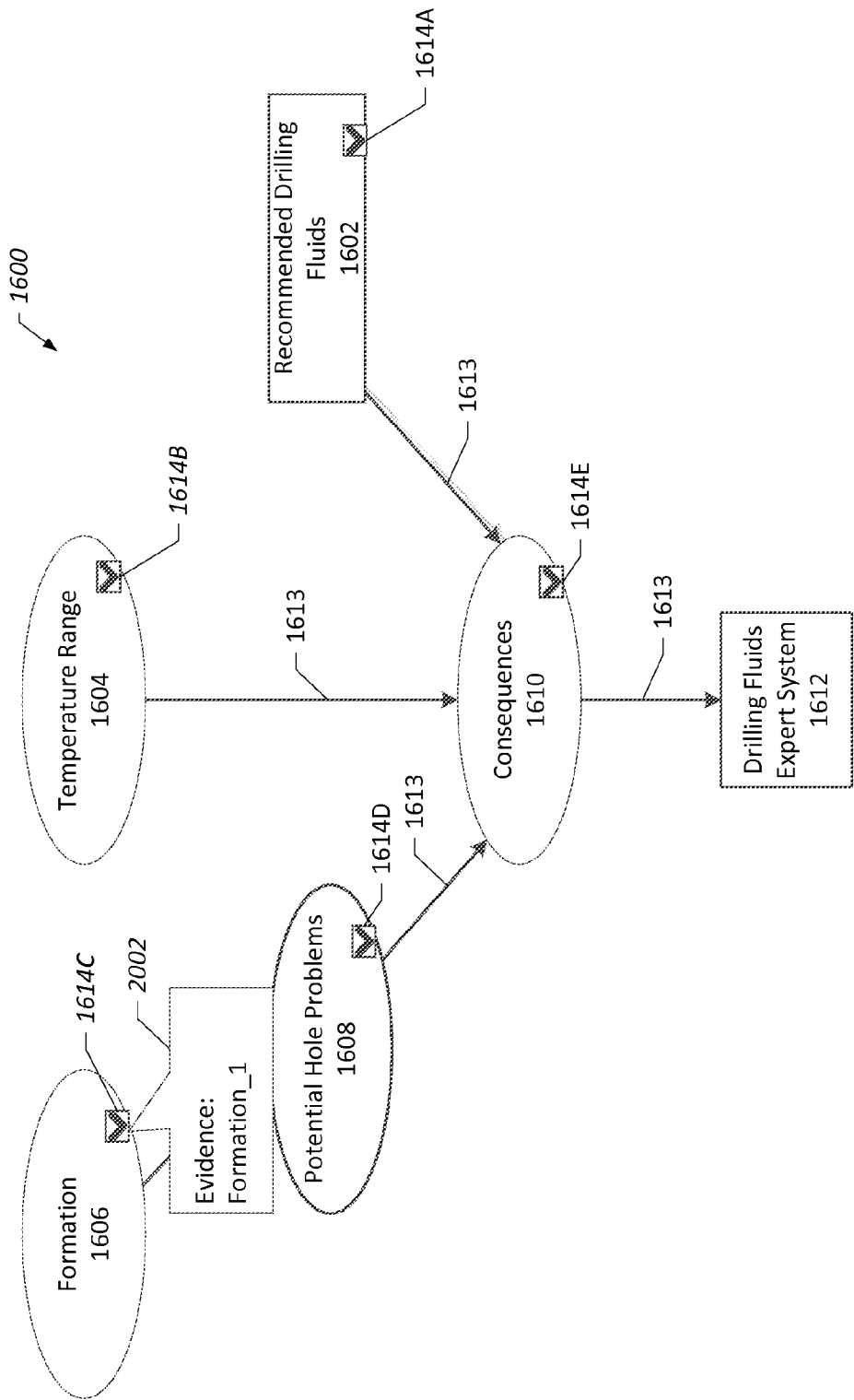

Additionally, as shown in FIG. 20B, a user may select (e.g., click) on the button 1614C to select an input 2002 for the formation uncertainty node 1606. If the user knows the formation used with the drilling system, the user may select an input for the formation uncertainty node 1606. The selected input 2002 ("Formation_1") may be displayed to the user to indicate the input to the formation uncertainty node 1606.

Figure 20C:
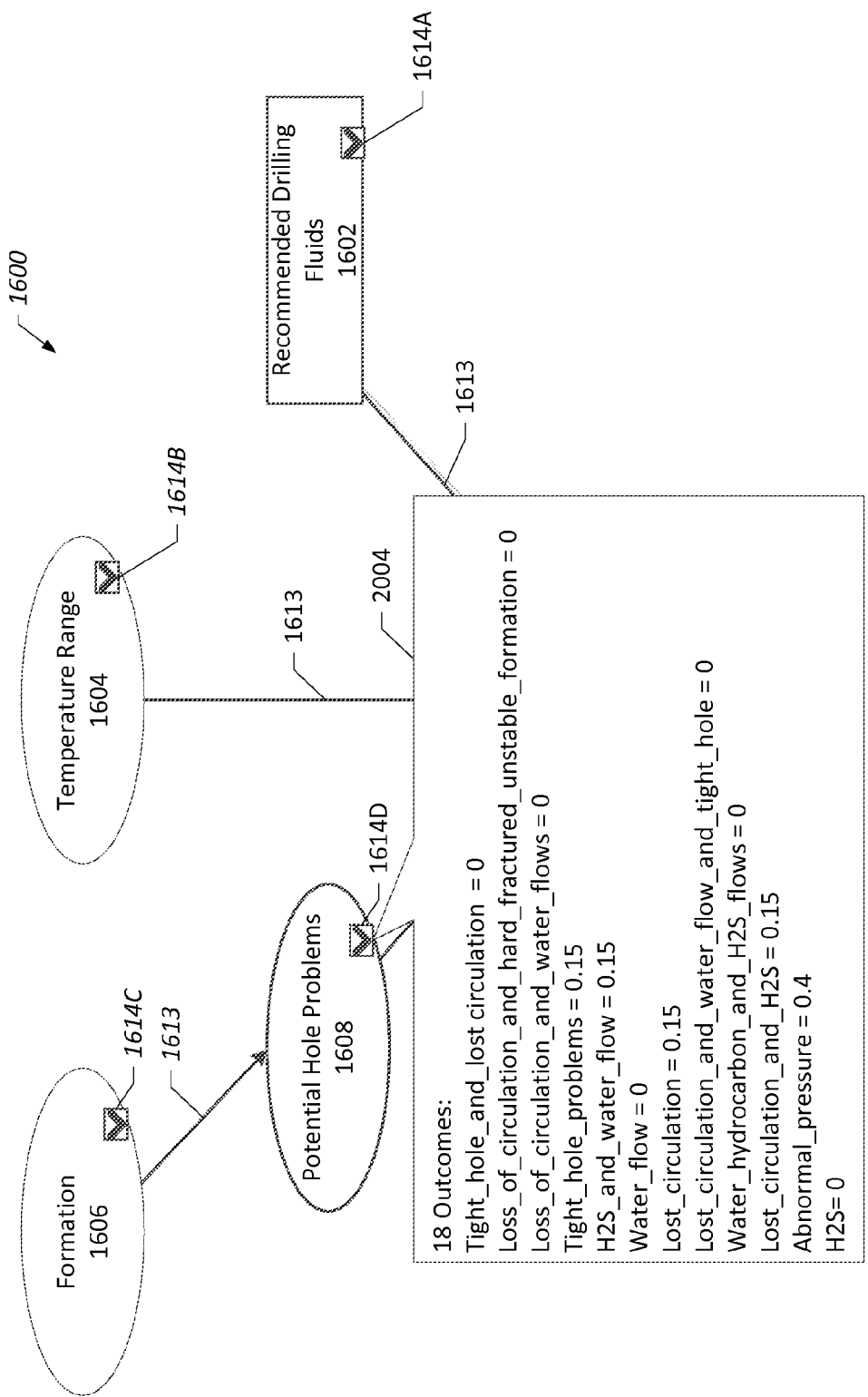

After a user has selected a formation, a user may view potential hole problems by selecting (e.g., clicking) the potential hole problems uncertainty node 1608. As illustrated in the model 1600 by the connection lines 1614, the potential hole problem inputs associated with the potential hole problems uncertainty node 1608 are affected by the input to the formation uncertainty node 1606. FIG. 20C depicts inputs 2004 to the potential hole problems uncertainty node 1608 based on the selected input to the formation uncertainty node 1606 shown in FIG. 20B and in accordance with an embodiment of the present invention. As described above in FIG. 20B, a user may select "Formation 1" as a selectable input to the formation uncertainty node 1606. Based on this selection, the inputs 2004 may be displayed after selecting (e.g., clicking) the button 1614C of the potential hole problems uncertainty node 1608. As shown in FIG. 20C, the inputs 2004 depict probability states associated with each potential hole problem based on the selected input to the formation uncertainty node 1606. The potential hole problem probabilities 2004 may include, for example, a probability of 0 for "Tight_hole_and_lost circulation," a probability of 0 for "Loss_of_circulation_and_hard_fractured_unstable_formation," a probability of 0 for "Loss_of_circulation_and_water_flows=0," a probability of 0.15 for "Tight_hole_problems," a probability of 0.15 for "H2S_and_water_flow," and so on.

As explained above, the drilling fluids BDN model 1600 may propagate the selected inputs at each node to determine the consequences via the consequences uncertainty node 1610, according to the techniques described above and illustrated in Equations 1, 2, and 4. In the embodiment described above in FIGS. 20A-20C, a user may select inputs to the temperature uncertainty node 1604 and the formation uncertainty node 1606. FIG. 21 depicts the output of the drilling fluids BDN model 1600 based on the inputs depicted in FIGS. 20A-20C in accordance with an embodiment of the present invention. The tables 2100 and 2102 may display the expected utility 2104 for drilling fluids 2106 (e.g., "Formulation_1" to "Formulation_10"). For example, as shown in FIG. 21, the drilling fluid "Formulation_2" has an expected utility value of 0.45, the drilling fluid "Formulation_4" has an expected utility value of 0.15, the drilling fluid "Formulation_5" has an expected utility value of 0.15, and the drilling fluid "Formulation_8" has an expected utility value of 0.85. The other formulations depicted in tables 2100 and 2102 have an expected utility value of 0. Accordingly, in this embodiment, a user may decide to select the recommended drilling fluid formulation having the highest expected utility value, i.e., Formulation_8.

Figure 22A:
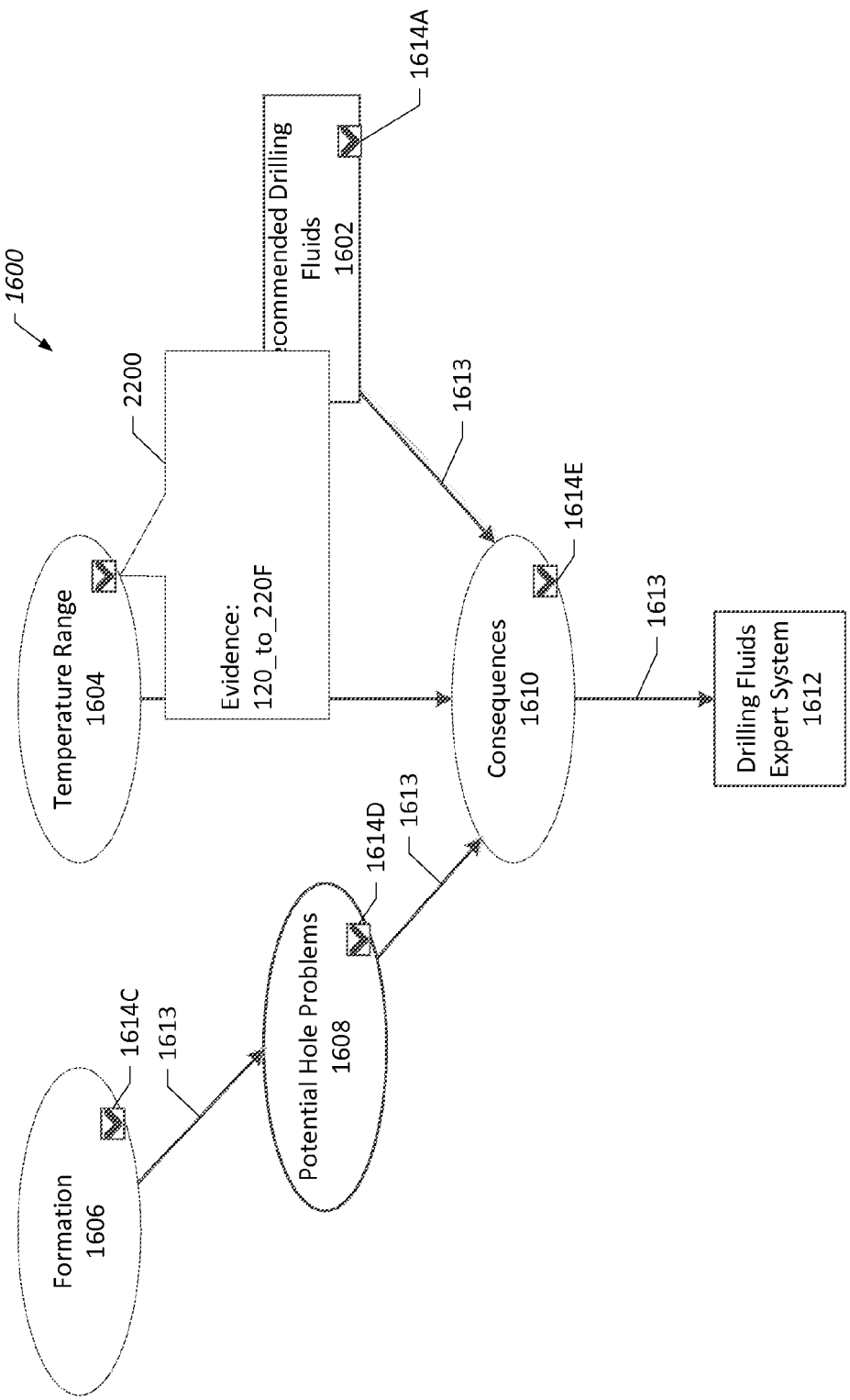
FIGS. 22A-22C depict the drilling fluids BDN model of FIG. 16A and various user selected inputs in accordance with an embodiment of the present invention.
Figure 22B:
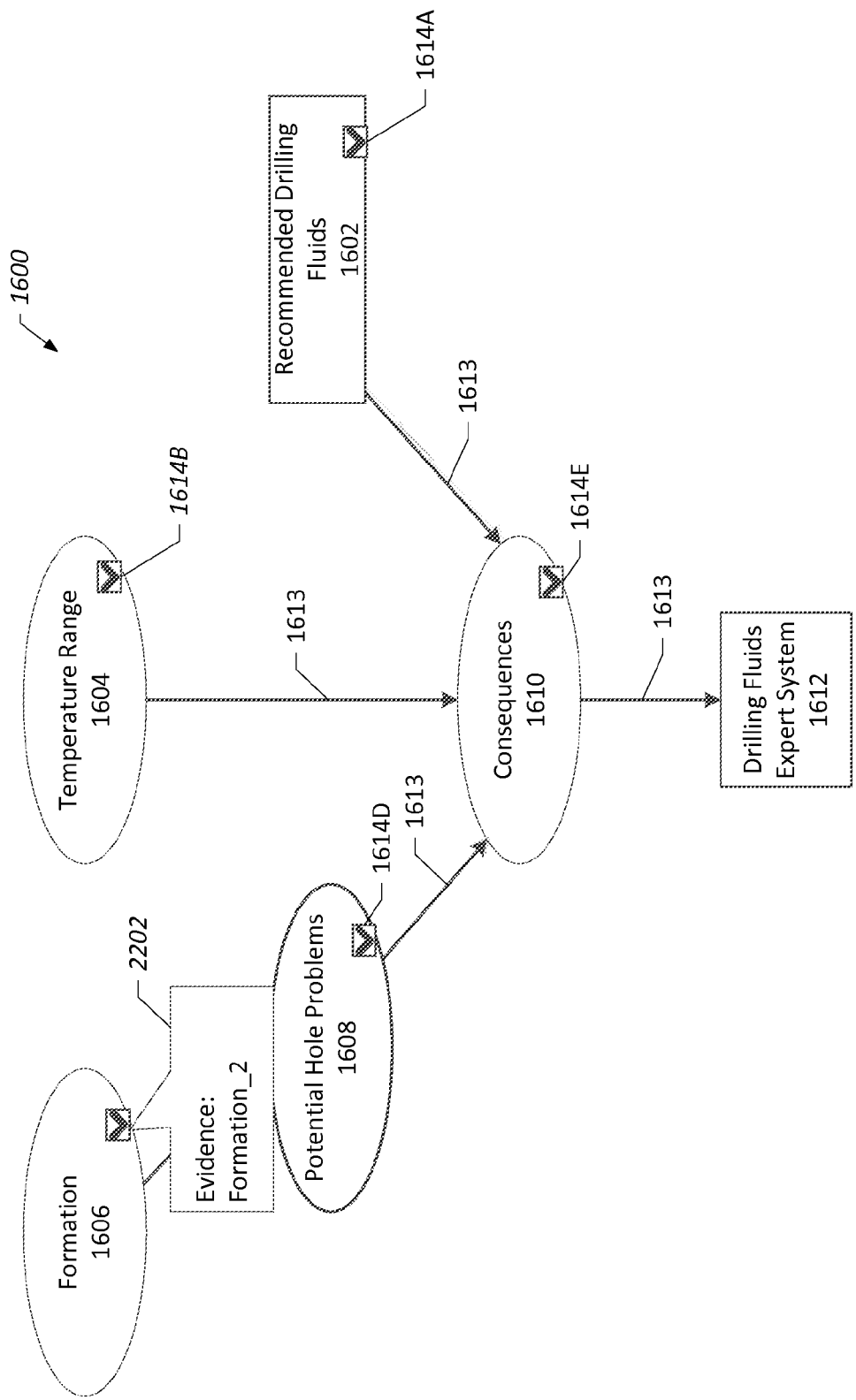

FIGS. 22-23 depict additional user selections of a formation input and a temperature range input in accordance with an embodiment of the present invention. As shown in the drilling fluids BDN model 1600 depicted in FIG. 22A, a user may input a temperature range, such as by selecting (e.g., clicking) the button 1614B. The selected input 220 ("120_to_220 F") may be displayed and entered as the input to the temperature range uncertainty node 1604. Next, as shown in FIG. 22B, a user may select a formation for the formation uncertainty node 1606, such as by selecting (e.g., clicking) the button 1614C. The selected input 2202 ("Formation 2") is displayed and provided as input to the formation uncertainty node 1606.

Figure 22C:
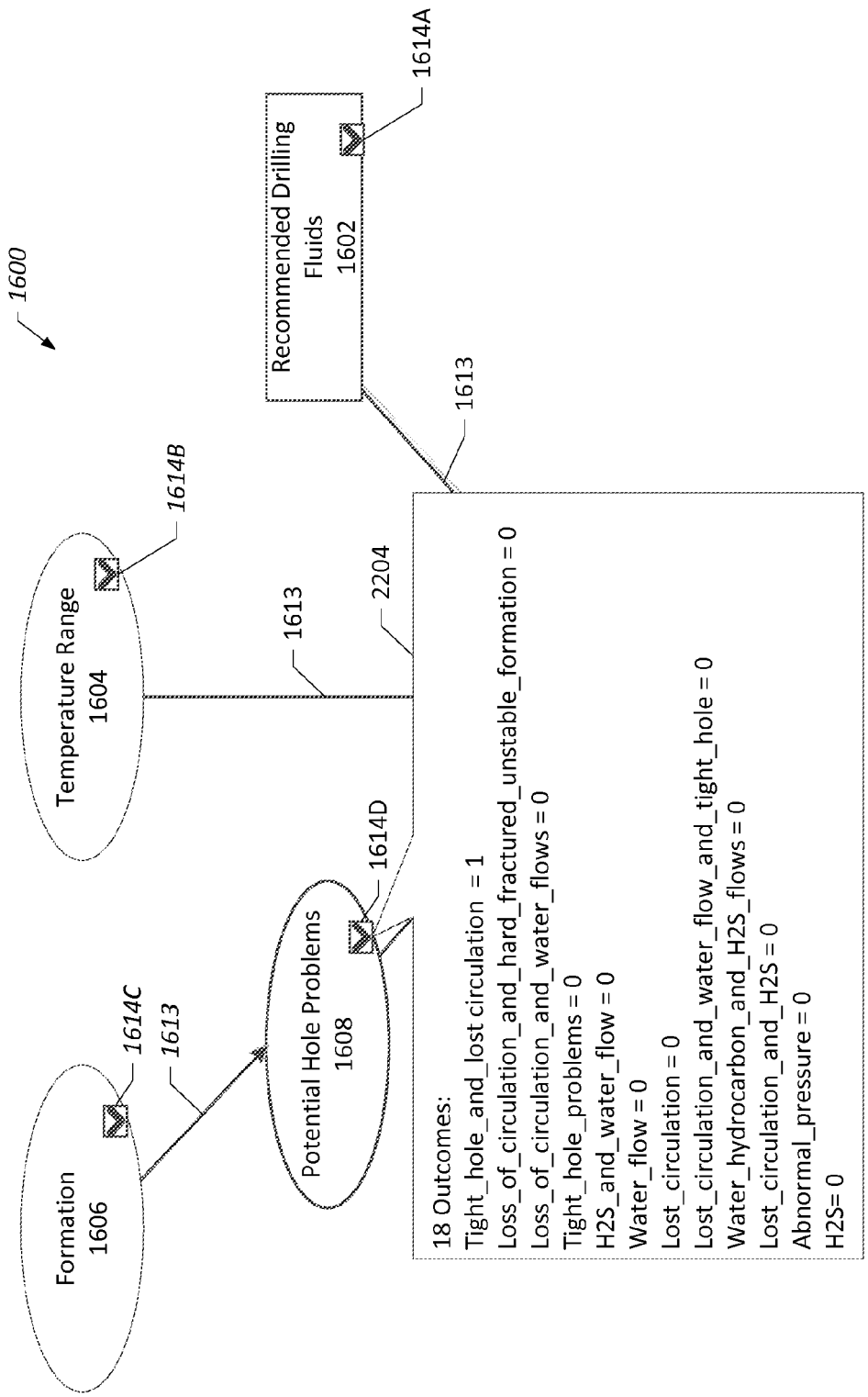

Here again, after a user has selected a formation, the user may view the probabilities associated with the potential hole problems uncertainty node 1608 by selecting (e.g., clicking) the button 1614D of the potential hole problems uncertainty node 1608. FIG. 22C depicts inputs 2204 to the potential hole problems uncertainty node 1608 based on the user selections described above in FIGS. 21A and 21B. As described above, the probabilities for the inputs to the potential hole problems uncertainty node 1608 are dependent on the input to the formation uncertainty node 1606. As shown in FIG. 22C, the inputs 2204 include probabilities associated with each potential hole problem as determined by the drilling fluids BDN model 1600 based on the selected inputs. The inputs 2204 may include, for example, a probability of 1 for "Tight_hole_and_lost_circulation" and a probability of 0 for the other potential hole problems.

Accordingly, the drilling fluids BDN model 1600 may use the selected described above to determine the consequences via the consequences uncertainty node 1610, according to the techniques described above in Equations 1, 2, and 4. Based on these inputs to the model 1610, and the determined probabilities for the potential hole problems uncertainty node 1608, recommended drilling fluids may be determined and expected utility values may be calculated according to the techniques described above. FIG. 23 depicts the results of these determinations in a manner similar to that described above and in accordance with an embodiment of the present invention. As shown in FIG. 23, tables 2300 and 2302 may display the expected utility 2104 for drilling fluids 2106 (e.g., "Formulation_1" to "Formulation_10). For example, as shown in FIG. 23, the drilling fluid "Formulation_1" has an expected utility value of 1, the drilling fluid "Formulation_3" has an expected utility value of 1, the drilling fluid "Formulation_5" has an expected utility value of 1, and the drilling fluids "Formulation_6" and "Formulation_7" also have an expected utility value of 1. The other formulations depicted in tables 2300 and 2302 have an expected utility value of 0. Accordingly, in this embodiment, a user may decide to select one of the drilling fluids formulations having expected utility values of 1, i.e., Formulation_1, Formulation_3, or the like.

Figure 24A:
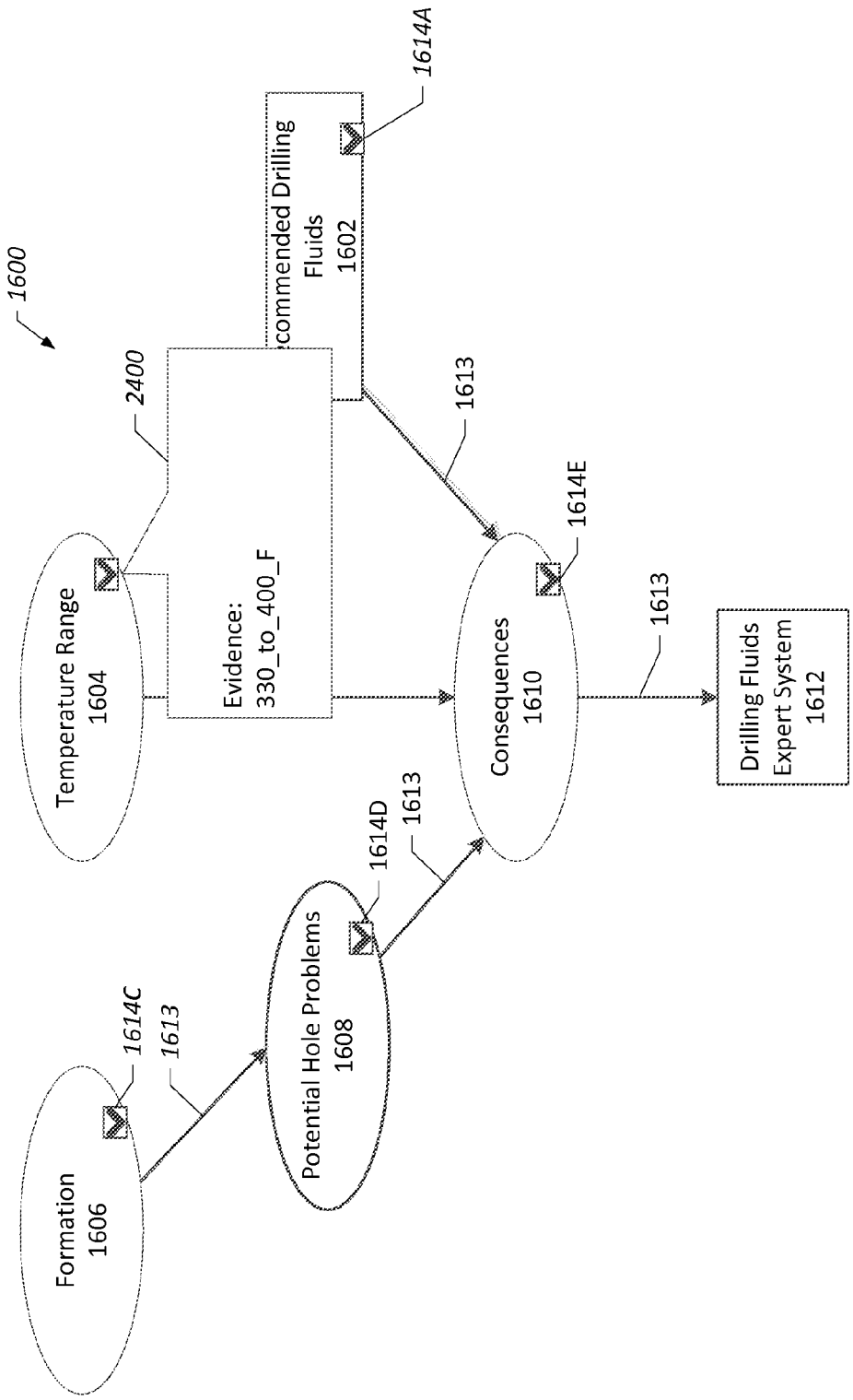
FIGS. 24A and 24B depict the drilling fluids BDN model of FIG. 16A and various user selected inputs in accordance with an embodiment of the present invention.
Figure 24B:
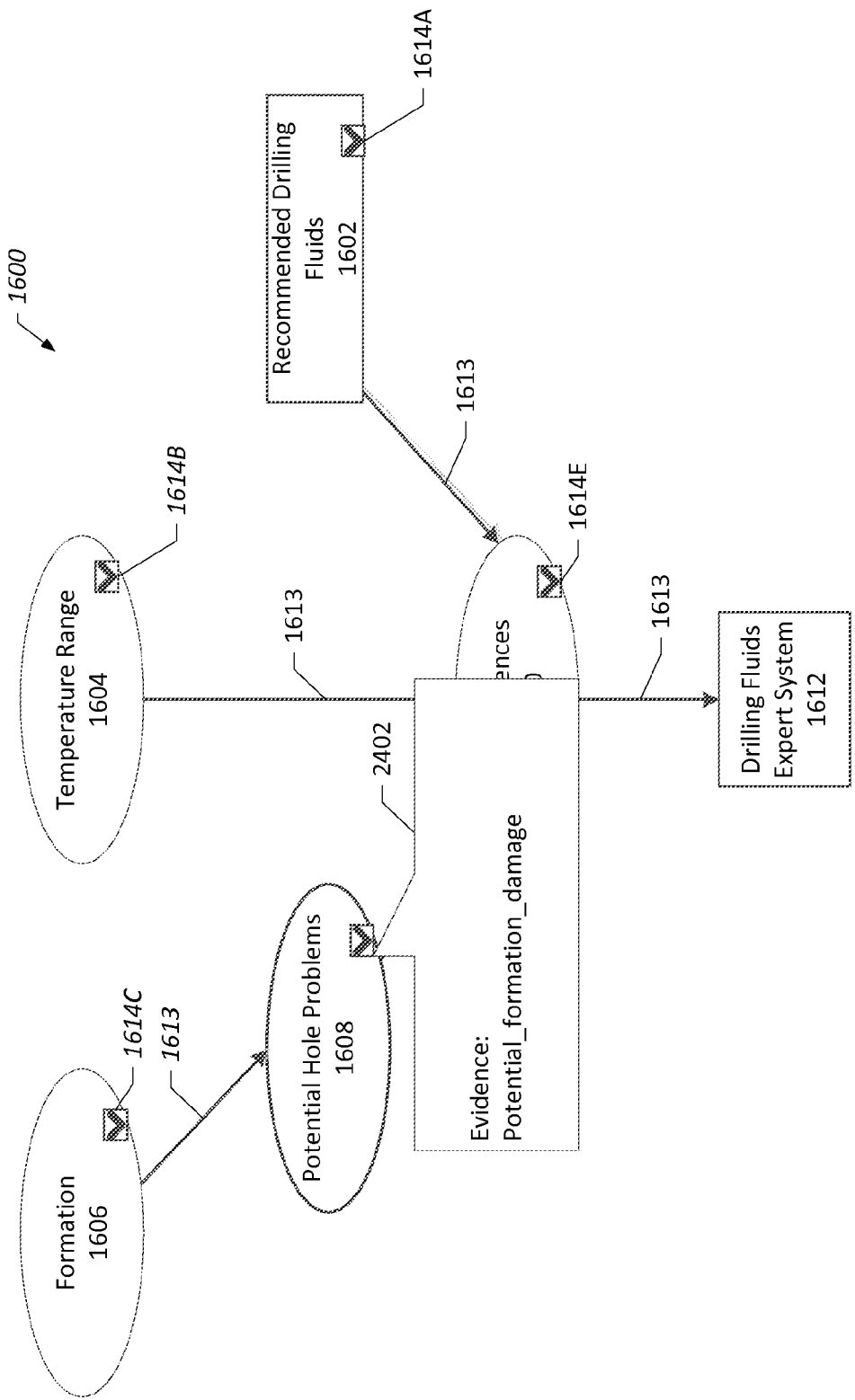

After entering the inputs described above in FIGS. 22A-22C and receiving the output depicted in FIG. 23, a user may select different inputs for the model 1600 to receive different determinations of recommended drilling fluids and expected utility values. For example, as shown in FIG. 24A, a user may enter a temperature range ("330_to_400 F") as an input 2400 to the temperature range uncertainty node 1604. Further, as shown in FIG. 24B, a user may enter a potential hole problems as an input 2402 to the potential hole problems uncertainty node 1608 by selecting (e.g., clicking) the button 1614C. As shown in FIG. 24B, for example, "potential_formation_damage" is selected as the input 2402.

Based on the modified inputs to the temperature range uncertainty node 1604 and the potential hole problems uncertainty node 1608, the drilling fluids BDN model 1600 may propagate the inputs to determine the consequences via the consequences uncertainty node 1610, according to the techniques described above and illustrated in Equations 1, 2, and 4. As described above, recommended drilling fluid formulations may be determined and expected utility values for the formulations may be calculated according to the techniques described in Equation 13. FIG. 25 depicts the output of the BDN model 1600 based on the inputs depicted in FIGS. 24A and 24B in tables 2500 and 2502 and in accordance with an embodiment of the present invention. As shown in FIG. 25, tables 2500 and 2502 may display the expected utility 2504 for drilling fluids 2506 (e.g., "Formulation_1" to "Formulation_2"). As will be appreciated, in contrast to the tables 2300 and 2302 depicted in FIG. 23, the modified inputs entered into the drilling fluids BDN model 1600 may result in different expected utilities 2504 for the recommended drilling fluids 2506. For example, in contrast to FIG. 23 and as shown in FIG. 25, the drilling fluid "Formulation_2" has an expected utility value of 1, the drilling fluid "Formulation_4" has an expected utility value of 1 and the drilling fluid "Formulation_8" has an expected utility value, whereas the other formulations depicted in tables 2500 and 2502 have expected utility values of 0.

Figure 26:
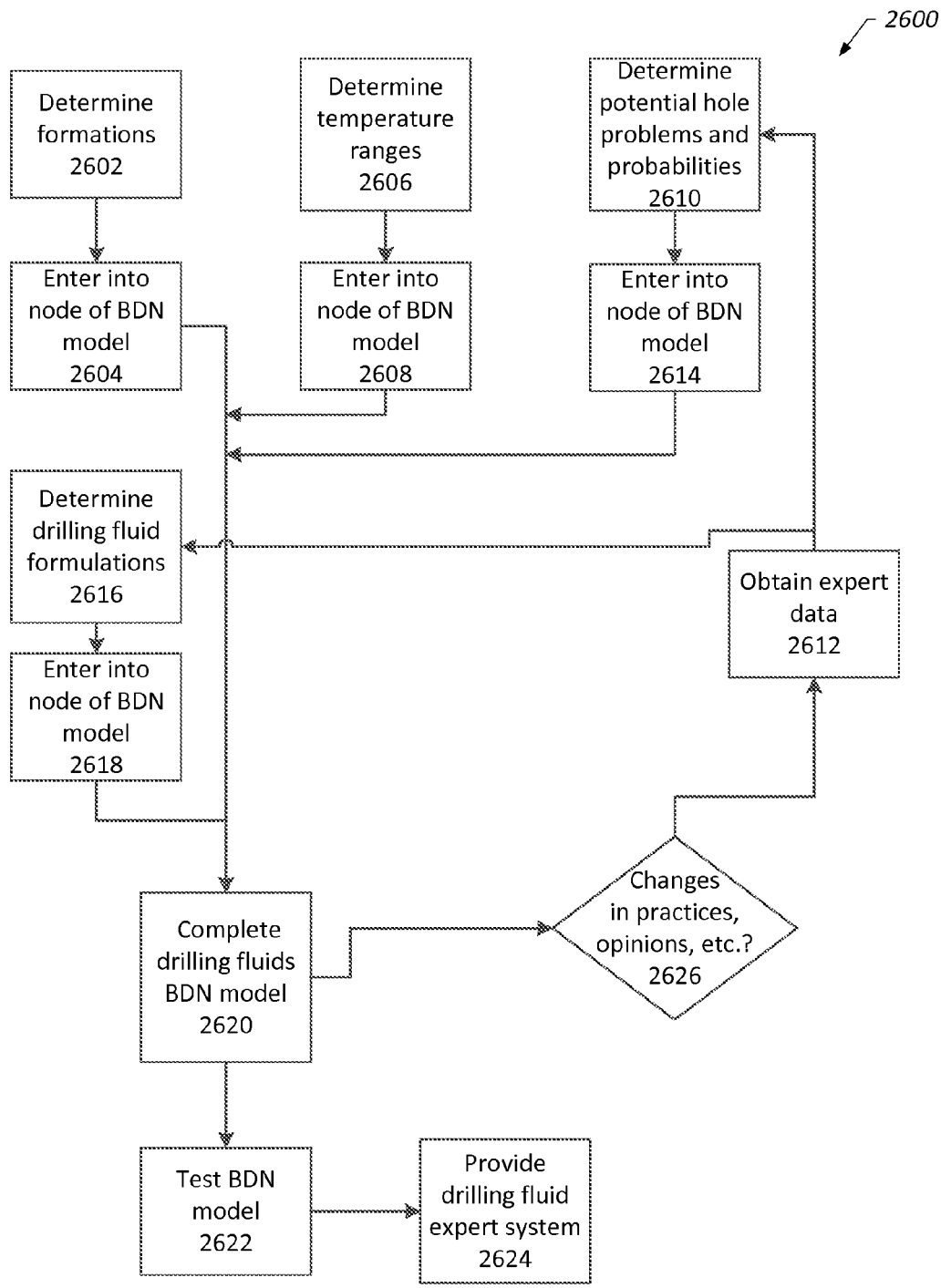
FIG. 26 is a block diagram of a process for constructing a drilling fluids BDN model for a drilling fluids expert system in accordance with an embodiment of the present invention.

The drilling fluids BDN model 1600 described herein may be constructed based on the various factors described above, such as formations (i.e., formation lithologies), temperature ranges, potential hole problems, and drilling fluid formulations. FIG. 26 depicts a process 2600 illustrating the construction of a drilling fluids BDN model, such as the drilling fluids BDN model 1600, in accordance with an embodiment of the present invention. Initially, for example, formations for use with a drilling fluids BDN model may be determined (block 2602). The formations may be determined based on the formations associated with a drilling system that may potentially use a drilling fluid formulation entered into the drilling fluids BDN model. Such formations may include, for example, names of oil fields or other specific formations, general formation lithologies, or other suitable identification of a formation. The determined formations may be entered into an uncertainty node in the drilling fluids BDN model (block 2604).

Additionally, temperature ranges for use with the drilling fluids BDN model may be determined (block 2606). The temperature ranges may be based on the operating ranges for the drilling fluids entered into the drilling fluids BDN model. For example, the temperature ranges may include ranges in any suitable units, such as Fahrenheit, Celsius, or Kelvin. Next, the determined temperature ranges may be entered into an uncertainty node in the drilling fluids BDN model (block 2608).

Further as shown in FIG. 26, potential hole problems may also be determined (block 2610). The potential hole problems may be determined from expert data. For example, expert data may be obtained (block 2612) from various sources, such as consultations with experts, scientific literature, expert reports, and the like. As described above, in the drilling fluids BDN model described herein, the potential hole problems and associated probability states may be influenced by the selected formations used in the model. Thus, the various probability states for these formations may be determined from the expert data obtained in the process 2600. As described above, in some embodiments the expert data may be used to generate probability data stored in a database. Next, the determined temperature ranges may be entered into an uncertainty node of the BDN model (block 2612).

Additionally, drilling fluid formulations for use in a drilling fluids BDN model may be determined (block 2608). The drilling fluid formulations may include the desired formulations options that may potentially be used with the formations entered into the model. Such drilling fluids may include liquids, gases, or other fluids and may be formed from a wide variety of formulations. These formulations may include water, foams, polymers, salts, lubricant, carbonate compounds, clays, thickeners, any other suitable chemical compounds or any combination thereof. The determined drilling fluids may then be entered into the decision node of the drilling fluids BDN model (block 2618). After all of the evidence has been entered into the nodes of the drilling fluids BDN model, the drilling fluid BDN model may be completed (block 2620). In some embodiments, after completing the drilling fluids BDN model, the completed model may be tested (block 2622). For example, inputs to the drilling fluids BDN model may be selected and the outputs, i.e., recommended drilling fluids and expected utility values, may be tested against manual determinations based on the expert data forming the basis for the drilling fluids BDN model. Finally, if the model is complete and tested, the drilling fluid expert system incorporating the drilling fluids BDN model may be provided for use (block 2624).

Advantageously, in the case of new and changed practices, expert opinions, etc., the drilling fluids BDN model may be updated by changing the probability states for the appropriate nodes. For example, the practices, expert opinions, and the like may be reviewed to determine if there are changes (decision block 2626). If there are new or changed practices, expert opinions, and the like (line 2628), then additional expert data may be obtained (block 2612) and used to determine potential hole problems (block 2610), drilling fluid formulations (block 2616), and so on. Any new and changed determinations may be entered into the appropriate nodes and an updated drilling fluids BDN model may be completed (block 2620).

Figure 27:
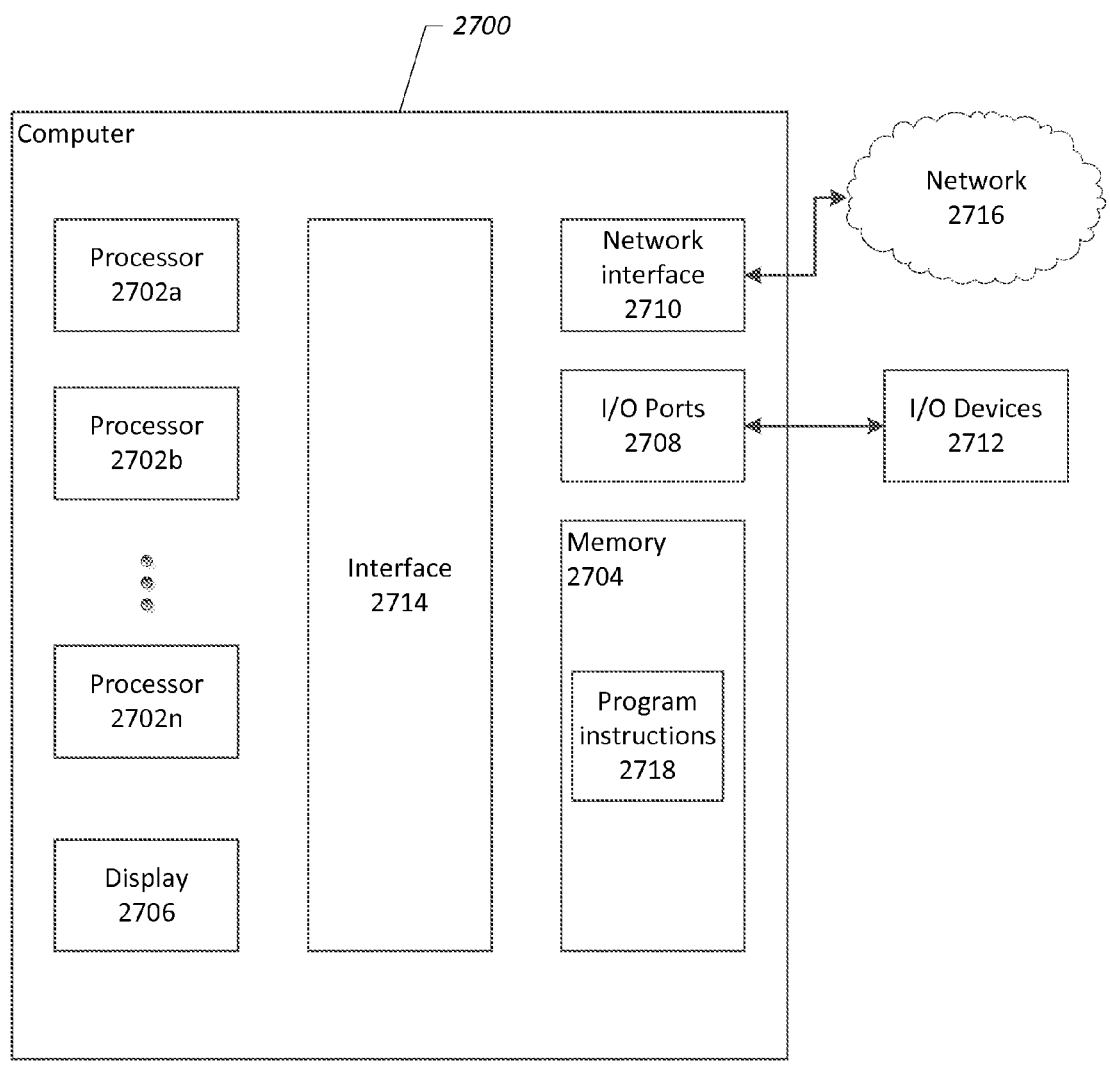
FIG. 27 is a block diagram of a computer in accordance with an embodiment of the present invention.

FIG. 27 depicts a computer 2700 in accordance with an embodiment of the present invention. Various portions or sections of systems and methods described herein include or are executed on one or more computers similar to computer 2700 and programmed as special-purpose machines executing some or all steps of methods described above as executable computer code. Further, processes and modules described herein may be executed by one or more processing systems similar to that of computer 2700. For example, the completion expert system 108 described may be implemented on one or more computers similar to computer 2700 and programmed to execute the Bayesian decision network model described above.

As will be understood by those skilled in the art, the computer 2700 may include various internal and external components that contribute to the function of the device and which may allow the computer 2700 to function in accordance with the techniques discussed herein. As will be appreciated, various components of computer 2700 may be provided as internal or integral components of the computer 2700 or may be provided as external or connectable components. It should further be noted that FIG. 27 depicts merely one example of a particular implementation and is intended to illustrate the types of components and functionalities that may be present in computer 2700. As shown in FIG. 27, the computer 2700 may include one or more processors (e.g., processors 2702a-2702n) coupled to a memory 2704, a display 2706, I/O ports 2708 and a network interface 2710, via an interface 2714.

Computer 2700 may include any combination of devices or software that may perform or otherwise provide for the performance of the techniques described herein. For example, the computer 2700 may be representative of the client computer 200 or a server implementing some or all portions of the completion expert system 108 or other components of the systems described above. Accordingly, the computer 2700 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 2700 may be a unified device providing any one of or a combination of the functionality of a media player, a cellular phone, a personal data organizer, a game console, and so forth. Computer 2700 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 2700 may allow a user to connect to and communicate through a network 2716 (e.g., the Internet, a local area network, a wide area network, etc.) and to acquire data from a satellite-based positioning system (e.g., GPS). For example, the computer 2700 may allow a user to communicate using the World Wide Web (WWW), e-mail, text messaging, instant messaging, or using other forms of electronic communication, and may allow a user to obtain the location of the device from the satellite-based positioning system, such as the location on an interactive map.

In one embodiment, the display 2706 may include a liquid crystal display (LCD) or an organic light emitting diode (OLED) display, although other display technologies may be used in other embodiments. The display 2706 may display a user interface (e.g., a graphical user interface), such a user interface for a Bayesian decision network. In accordance with some embodiments, the display 2706 may include or be provided in conjunction with touch sensitive elements through which a user may interact with the user interface. Such a touch-sensitive display may be referred to as a "touch screen" and may also be known as or called a touch-sensitive display system.

The processor 2702 may provide the processing capability required to execute the operating system, programs, user interface, and any functions of the computer 2700. The processor 2702 may receive instructions and data from a memory (e.g., system memory 2704). The processor 2702 may include one or more processors, such as "general-purpose" microprocessors, and special purpose microprocessors, such as ASICs. For example, the processor 2702 may include one or more reduced instruction set (RISC) processors, such as those implementing the Advanced RISC Machine (ARM) instruction set. Additionally, the processor 2702 may include single-core processors and multicore processors and may include graphics processors, video processors, and related chip sets. Accordingly, computer 2700 may be a uni-processor system including one processor (e.g., processor 2702*a*), or a multi-processor system including any number of suitable processors (e.g., 2702*a*-2702*n*). Multiple processors may be employed to provide for parallel or sequential execution of one or more sections of the techniques described herein. Processes, such as logic flows, described herein may be performed by one or more programmable processors executing one or more computer programs to perform functions by operating on input data and generating corresponding output.

As will be understood by those skilled in the art, the memory 2704 (which may include one or more tangible non-transitory computer readable storage medium) may include volatile memory, such as random access memory (RAM), and non-volatile memory, such as ROM, flash memory, a hard drive, any other suitable optical, magnetic, or solid-state storage medium, or a combination thereof. The memory 2704 may be accessible by the processor 2702 and other components of the computer 2700. The memory 2704 may store a variety of information and may be used for a variety of purposes. The memory 2704 may store executable computer code, such as the firmware for the computer 2700, an operating system for the computer 2700, and any other programs or other executable code necessary for the computer 2700 to function. The executable computer code may include program instructions 2718 executable by a processor (e.g., one or more of processors 2702*a*-2702*n*) to implement one or more embodiments of the present invention. Instructions 2718 may include modules of computer program instructions for implementing one or more techniques described. Program instructions 2718 may define a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a section of a file that holds other programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more computer processors located locally at one site or distributed across multiple remote sites and interconnected by a communication network. In addition, the memory 2704 may be used for buffering or caching during operation of the computer 2700. The memory 2704 may also store data files such as media (e.g., music and video files), software (e.g., for implementing functions on computer 2700), preference information (e.g., media playback preferences), wireless connection information (e.g., information that may enable media device to establish a wireless connection), telephone information (e.g., telephone numbers), and any other suitable data.

As mentioned above, the memory 2704 may include volatile memory, such as random access memory (RAM). The memory 2704 may also include non-volatile memory, such as ROM, flash memory, a hard drive, any other suitable optical, magnetic, or solid-state storage medium, or a combination thereof. The interface 2714 may include multiple interfaces and may couple various components of the computer 2700 to the processor 2702 and memory 2704. In some embodiments, the interface 2714, the processor 2702, memory 2704, and one or more other components of the computer 2700 may be implemented on a single chip, such as a system-on-a-chip (SOC). In other embodiments, these components, their functionalities, or both may be implemented on separate chips. The interface 2714 may be configured to coordinate I/O traffic between processors 2702*a*-2702*n*, system memory 2704, network interface 1270, I/O devices 1412, other peripheral devices, or a combination thereof. The interface 2714 may perform protocol, timing or other data transformations to convert data signals from one component (e.g., system memory 2704) into a format suitable for use by another component (e.g., processors 2702*a*-2702*n*). The interface 2714 may include support for devices attached through various types of peripheral buses, such as a variant of the Peripheral Component Interconnect (PCI) bus standard or the Universal Serial Bus (USB) standard.

The computer 2700 may also include an input and output port 2708 to allow connection of additional devices, such as I/O devices 2712. Embodiments of the present invention may include any number of input and output ports 2708, including headphone and headset jacks, universal serial bus (USB) ports, Firewire or IEEE-1394 ports, and AC and DC power connectors. Further, the computer 2700 may use the input and output ports to connect to and send or receive data with any other device, such as other portable computers, personal computers, printers, etc.

The computer 2700 depicted in FIG. 27 also includes a network interface 2710, such as a wired network interface card (NIC), wireless (e.g., radio frequency) receivers, etc. For example, the network interface 2710 may receive and send electromagnetic signals and communicate with communications networks and other communications devices via the electromagnetic signals. The network interface 2710 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 1270 may communicate with networks (e.g., network 2716), such as the Internet, an intranet, a cellular telephone network, a wireless local area network (LAN), a metropolitan area network (MAN), or other devices by wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP), or any other suitable communication protocol.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A system, comprising
   one or more processors;
   a non-transitory tangible computer-readable memory, the memory comprising:
      a drilling fluids expert system executable by the one or more processors and configured to provide one or more drilling fluids recommendations based on one or more inputs, the drilling fluids expert system comprising a drilling fluids Bayesian decision network (BDN) model, the drilling fluids BDN model comprising
         a temperature ranges uncertainty node configured to receive one or more temperature ranges from the one or more inputs, each of the one or more temperature ranges associated with a respective one or more temperature range probabilities;
         a formations uncertainty node configured to receive one or more formations from the one or more inputs, each of the one or more formations associated with a respective one or more formation probabilities;
         a potential hole problems uncertainty node dependent on the formations uncertainty node and configured to receive one or more potential hole problems from the one or more inputs and the one or more formation probabilities, each of the one or more potential hole problems associated with a respective one or more potential hole problem probabilities;
         a drilling fluids decision node configured to receive one or more drilling fluids from the one or more inputs; and
         a consequences node dependent on the temperature ranges uncertainty node, the potential hole problems uncertainty node, and the drilling fluids decision node and configured to output the one or more drilling fluids recommendations based on one or more Bayesian probabilities calculated from the one or more temperature ranges and the one more temperature range probabilities, the one or more potential hole problems and the one or more potential hole problem probabilities, and the one or more drilling fluids.

2. The system of claim 1, comprising a user interface configured to display the drilling fluids BDN model and receive user selections of the one or more input.

3. The system of claim 1, wherein the one or more temperature ranges, the one or more formations, and the one or more potential hole problems are each associated with a respective plurality of probabilities.

4. The system of claim 1, wherein the respective plurality of probabilities is obtained from an expert date data repository storing expert data.

5. The system of claim 1, wherein the one or more drilling fluids recommendations comprise one or more drilling fluid formulations.

6. The system of claim 1, wherein the one or more drilling fluids recommendations comprises one or more expected utilities for the one or more drilling fluid formations.

7. The system of claim 1, wherein the one or more expected utilities are provided in a table displayed to the user in the user interface, the table comprising the one or more drilling fluid formulations and the expected utility value for each of the one or more drilling fluid formulations.

8. The system of claim 1, wherein the one or more formations comprise at least one of: formation names, formation lithologies, formation types, or any combination thereof.

9. A computer-implemented method for a drilling fluids expert system having a drilling fluids Bayesian decision network (BDN) model, the method comprising:
receiving, at one or more processors, one or more inputs;
providing, by one or more processors, the one or more inputs to one or more nodes of the drilling fluids BDN model, the one or more nodes comprising:
a temperature ranges uncertainty node configured to receive one or more temperature ranges from the one or more inputs, each of the one or more temperature ranges associated with a respective one or more temperature range probabilities;
a formations uncertainty node configured to receive one or more formations from the one or more inputs each of the one or more formations associated with a respective one or more formation probabilities;
a potential hole problems uncertainty node dependent on the formations uncertainty node and configured to receive one or more potential hole problems from the one or more inputs and the one or more formation probabilities, each of the one or more potential hole problems associated with a respective one or more potential hole problem probabilities;
a drilling fluids decision node; and
a consequences node dependent on the temperature ranges uncertainty node, the potential hole problems uncertainty node, and the drilling fluids decision node;
determining, at one or more processors, one or more drilling fluids recommendations at the consequences node of the drilling fluids BDN model, the determination comprising a calculation of one or more Bayesian probabilities based on the one or more inputs; and
providing, by one or more processors, the one or more drilling fluids recommendations to a user.

10. The computer-implemented method of claim 9, wherein providing the one or more drilling fluid recommendations to a user comprises displaying, by one or more processors, the one or more drilling fluid recommendations in a user interface element of a user interface configured to display the drilling fluids BDN model.

11. The computer-implemented method of claim 9, wherein receiving one or inputs comprises receiving, at one or more processors, a user selection for the temperature ranges uncertainty node, a user selection for the formations uncertainty node, a user selection for the potential hole problems uncertainty node, or a combination thereof.

12. The computer-implemented method of claim 9, wherein the one or more drilling fluids recommendations comprise one or more drilling fluid formulations.

13. The computer-implemented method of claim 9, wherein the one or more drilling fluids recommendations comprises one or more expected utilities for the one or more drilling fluid formations.

14. The computer-implemented method of claim 9, wherein providing the one or more drilling fluids recommendations to a user comprises providing, by one or more processors, a table displayed to the user in the user interface, the table comprising the one or more drilling fluid formulations and the expected utility value for each of the one or more drilling fluid formulations.

15. The computer-implemented method of claim 9, wherein the one or more formations comprise at least one of: formation names, formation lithologies, formation types, or any combination thereof.

16. The computer-implemented method of claim 9, wherein the one or more inputs provided to the temperature ranges uncertainty node, the formations uncertainty node, and the potential hole problems uncertainty node, are associated with a respective plurality of probabilities.

17. The computer-implemented method of claim 16, comprising associating, by one or more processors, the respective plurality of probabilities based on a user selection of the one or more inputs.

18. A computer-implemented method of determining a drilling fluid formulation for a drilling system, the method comprising:
receiving, at one or more processors, an input from a user, the input comprising a temperature range, a formation, a potential hole problem, or any combination thereof;
providing, by one or more processors, the input to a drilling fluids Bayesian decision network (BDN) model configured to receive one or more drilling fluid formulations;
determining, by one or more processors, an expected utility value for the one or more drilling fluid formulations based on the input, the determination comprising a calculation of one or more Bayesian probabilities for the one or more drilling fluid formulations based on the input; and
providing, by one or more processors, an output from the drilling fluids BDN model, the output comprising one or more recommended drilling fluid formulations selected from the one or more drilling fluid formulations.

19. The computer-implemented method of claim 18, comprising displaying, by one or more processors, a plurality of temperature ranges, a plurality of formations, a plurality of potential hole problems or a combination there of in a user interface element displayed to the user.

20. The computer-implemented method of claim 19, wherein providing, by one or more processors, the output from the drilling fluids BDN model comprises providing a table displayed to the user in the user interface, the table comprising the one or more drilling fluid formulations and the expected utility value for each of the one or more drilling fluid formulations.

* * * * *

UNITED STATES PATENT AND TRADEMARK OFFICE
CERTIFICATE OF CORRECTION

PATENT NO.         : 9,202,169 B2
APPLICATION NO.    : 13/827408
DATED              : December 1, 2015
INVENTOR(S)        : Absullah Saleh Hussain Al-Yami et al.

Page 1 of 1

It is certified that error appears in the above-identified patent and that said Letters Patent is hereby corrected as shown below:

In The Claims
In Column 25, Line 4, Claim 4, the third to last word "date" should be removed.

Signed and Sealed this
Twenty-third Day of February, 2016

Michelle K. Lee
*Director of the United States Patent and Trademark Office*